(12) United States Patent
Sharma et al.

(10) Patent No.: US 11,974,155 B2
(45) Date of Patent: Apr. 30, 2024

(54) TECHNIQUES FOR TIME ALIGNMENT OF MEASUREMENT GAPS AND FREQUENCY HOPS

(71) Applicant: QUALCOMM Incorporated, San Diego, CA (US)

(72) Inventors: Prashant Sharma, San Jose, CA (US); Changhwan Park, San Diego, CA (US); Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 17/482,705

(22) Filed: Sep. 23, 2021

(65) Prior Publication Data

US 2023/0090394 A1 Mar. 23, 2023

(51) Int. Cl.
*H04L 5/00* (2006.01)
*H04W 24/10* (2009.01)

(52) U.S. Cl.
CPC .......... *H04W 24/10* (2013.01); *H04L 5/0012* (2013.01); *H04L 5/0078* (2013.01)

(58) Field of Classification Search
CPC ................................................... H04L 5/0012
See application file for complete search history.

(56) References Cited

U.S. PATENT DOCUMENTS

| | | | |
|---|---|---|---|
| 2016/0219601 A1* | 7/2016 | Lin | H04L 5/0044 |
| 2018/0227011 A1* | 8/2018 | Yerramalli | H04B 1/713 |
| 2019/0037427 A1* | 1/2019 | Yerramalli | H04W 72/04 |
| 2019/0037525 A1* | 1/2019 | Liu | H04W 64/003 |
| 2019/0239059 A1* | 8/2019 | Koorapaty | H04J 11/0069 |
| 2020/0336973 A1* | 10/2020 | Niu | H04B 1/7156 |
| 2020/0382157 A1* | 12/2020 | Bhamri | H04B 1/7143 |
| 2021/0092008 A1* | 3/2021 | Yi | H04J 1/02 |
| 2021/0242985 A1* | 8/2021 | Nam | H04L 5/0012 |
| 2023/0084448 A1* | 3/2023 | Sharma | H04B 1/7156 375/133 |
| 2023/0147301 A1* | 5/2023 | Sharma | H04L 5/0094 370/329 |
| 2023/0180173 A1* | 6/2023 | Kazmi | H04L 5/001 455/456.1 |
| 2023/0180174 A1* | 6/2023 | Yerramalli | G01S 1/0428 455/456.3 |

* cited by examiner

*Primary Examiner* — Samina F Choudhry
*Assistant Examiner* — Salma Ayad
(74) *Attorney, Agent, or Firm* — Dalei Dong; Holland & Hart LLP

(57) ABSTRACT

Methods, systems, and devices for wireless communications are described in which a user equipment (UE) may be configured with a frequency hopping pattern for communication between the UE and a base station, and also may be configured with a measurement gap pattern for measurement of one or more reference signals from one or more neighboring base stations. One or more switching timings of a set of switching timings of the frequency hopping pattern may be aligned with a reference point associated with the measurement gap pattern, which may provide aligned switching gaps in the frequency hopping pattern and the measurement gap pattern.

27 Claims, 25 Drawing Sheets

TECHNIQUES FOR TIME ALIGNMENT OF MEASUREMENT GAPS AND FREQUENCY HOPS

FIELD OF TECHNOLOGY

The following relates to wireless communications, including techniques for time alignment of measurement gaps and frequency hops.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, one or more devices may implement frequency hopping in which communications are transmitted using different frequencies according to a frequency hopping pattern. Such techniques may provide enhanced frequency diversity for communications, and enhance likelihood of successful decoding at a receiving device. When performing frequency hops, the transmitting device may have gaps in transmissions at frequency hop boundaries, that result from switching of radio frequency (RF) components from one frequency to a different frequency. Efficient management of transmissions that use frequency hopping may help to enhance overall efficiency of wireless communications.

SUMMARY

The described techniques relate to improved methods, systems, devices, and apparatuses that support techniques for time alignment of measurement gaps and frequency hops. In various aspects, the described techniques provide for identifying a frequency hopping pattern for communications between a user equipment (UE) and a base station, and also identifying a measurement gap pattern for measurement of one or more reference signals from one or more neighboring base stations. One or more switching timings of a set of switching timings of the frequency hopping pattern may be aligned with a reference point associated with the measurement gap pattern, which may provide aligned switching gaps in the frequency hopping pattern and the measurement gap pattern. In some cases, the frequency hopping pattern may be selected from a number of different available frequency hopping patterns such that at least one boundary associated with the set of switching timings is aligned with the reference point of the measurement gap pattern. In some cases, a duration of one or more frequency hops of the frequency hopping pattern may be adjusted such that at least one boundary associated with the set of switching timings is aligned with the reference point of the measurement gap pattern.

A method for wireless communication at a user equipment (UE) is described. The method may include identifying a bandwidth part hopping pattern for communication with a first base station, and a set of switching timings for switching between different frequencies of a set of frequencies within a carrier bandwidth for the communications with the first base station, identifying a measurement gap pattern for measurement of one or more reference signals from one or more neighboring base stations, the measurement gap pattern indicates a measurement gap length and a periodicity of repetitions of measurement gaps, adjusting at least one of the set of switching timings to align with a reference point associated with the measurement gap pattern, communicating with the first base station using the bandwidth part hopping pattern according to the adjusted switching timings, and measuring the one or more reference signals from the one or more neighboring base stations according to the measurement gap pattern.

An apparatus for wireless communication at a UE is described. The apparatus may include a processor, memory coupled with the processor, and instructions stored in the memory. The instructions may be executable by the processor to cause the apparatus to identify a bandwidth part hopping pattern for communication with a first base station, and a set of switching timings for switching between different frequencies of a set of frequencies within a carrier bandwidth for the communications with the first base station, identify a measurement gap pattern for measurement of one or more reference signals from one or more neighboring base stations, the measurement gap pattern indicates a measurement gap length and a periodicity of repetitions of measurement gaps, adjust at least one of the set of switching timings to align with a reference point associated with the measurement gap pattern, communicate with the first base station using the bandwidth part hopping pattern according to the adjusted switching timings, and measure the one or more reference signals from the one or more neighboring base stations according to the measurement gap pattern.

Another apparatus for wireless communication at a UE is described. The apparatus may include means for identifying a bandwidth part hopping pattern for communication with a first base station, and a set of switching timings for switching between different frequencies of a set of frequencies within a carrier bandwidth for the communications with the first base station, means for identifying a measurement gap pattern for measurement of one or more reference signals from one or more neighboring base stations, the measurement gap pattern indicates a measurement gap length and a periodicity of repetitions of measurement gaps, means for adjusting at least one of the set of switching timings to align with a reference point associated with the measurement gap pattern, means for communicating with the first base station using the bandwidth part hopping pattern according to the adjusted switching timings, and means for measuring the one or more reference signals from the one or more neighboring base stations according to the measurement gap pattern.

A non-transitory computer-readable medium storing code for wireless communication at a UE is described. The code may include instructions executable by a processor to identify a bandwidth part hopping pattern for communication with a first base station, and a set of switching timings for switching between different frequencies of a set of frequencies within a carrier bandwidth for the communications with the first base station, identify a measurement gap pattern for measurement of one or more reference signals from one or more neighboring base stations, the measurement gap pattern indicates a measurement gap length and a periodicity of repetitions of measurement gaps, adjust at least one of the set of switching timings to align with a reference point associated with the measurement gap pattern, communicate with the first base station using the bandwidth part hopping pattern according to the adjusted switching timings, and measure the one or more reference signals from the one or more neighboring base stations according to the measurement gap pattern.

Some examples of the method, apparatuses, and non-transitory computer-readable medium described herein may further include operations, features, means, or instructions for receiving, from the first base station, information that indicates the bandwidth part hopping pattern and the measurement gap pattern, and where the reference point corresponds to an end time of a first measurement gap and a start time of a first frequency hop of the bandwidth part hopping pattern is aligned with the reference point, or the reference point corresponds to a start time of the first measurement gap and an end time of the first frequency hop is aligned with the reference point. In some examples of the method, apparatuses, and non-transitory computer-readable medium described herein, the bandwidth part hopping pattern and the measurement gap pattern share a common switching gap for retuning to a different frequency at the UE.

In some examples of the method, apparatuses, and non-transitory computer-readable medium described herein, the reference point corresponds to a start time of a first measurement gap, and where the bandwidth part hopping pattern and the measurement gap pattern are selected to provide alignment of the reference point and an end time of a first frequency hop of the bandwidth part hopping pattern. In some examples of the method, apparatuses, and non-transitory computer-readable medium described herein, the reference point corresponds to an end time of a first measurement gap, and where the bandwidth part hopping pattern and the measurement gap pattern are selected to provide alignment of the reference point and a start time of a first frequency hop of the bandwidth part hopping pattern.

In some examples of the method, apparatuses, and non-transitory computer-readable medium described herein, the adjusting may include operations, features, means, or instructions for adjusting a duration of a first hop of the bandwidth part hopping pattern that overlaps with, or is adjacent to, a first measurement gap of the measurement gap pattern, to provide alignment of the reference point with a start or end time of a first frequency hop of the bandwidth part hopping pattern. In some examples of the method, apparatuses, and non-transitory computer-readable medium described herein, the first hop precedes the first measurement gap, and an ending time of the first hop is extended to provide an ending time boundary that is aligned with the reference point. In some examples of the method, apparatuses, and non-transitory computer-readable medium described herein, the first hop overlaps the first measurement gap, and an ending time of the first hop is extended to provide an ending time boundary that corresponds to a subsequent hop to the first hop, and where a frequency switch associated with the subsequent hop is skipped. In some examples of the method, apparatuses, and non-transitory computer-readable medium described herein, the first hop follows the first measurement gap, and a starting time of the first hop is advanced to provide a starting time boundary that is aligned with the reference point.

In some examples of the method, apparatuses, and non-transitory computer-readable medium described herein, the adjusting may include operations, features, means, or instructions for determining whether to extend or shorten a duration of a subsequent hop to the first hop based on a non-overlapping duration of the first hop and the first measurement gap, a frequency separation from a prior hop of the bandwidth part hopping pattern that is prior to the first measurement gap, the duration of the first hop relative to a measurement gap duration, or any combinations thereof. In some examples of the method, apparatuses, and non-transitory computer-readable medium described herein, the adjusting may include operations, features, means, or instructions for adjusting a duration of a first hop of the bandwidth part hopping pattern to align an ending time of the first hop with the reference point and shifting subsequent hops to the first hop of the bandwidth part hopping pattern by an amount of the adjusted duration of the first hop, and where respective durations of the subsequent hops are unchanged.

A method for wireless communication at a first base station is described. The method may include identifying a bandwidth part hopping pattern for a UE for communication with the first base station, and a set of switching timings for switching between different frequencies of a set of frequencies within a carrier bandwidth for the communications with the first base station, identifying a measurement gap pattern for UE measurement of one or more reference signals from one or more neighboring base stations, the measurement gap pattern indicates a measurement gap length and a periodicity of repetitions of measurement gaps, adjusting at least one of the set of switching timings to align with a reference point associated with the measurement gap pattern, and communicating with the UE using the bandwidth part hopping pattern according to the adjusted switching timings.

An apparatus for wireless communication at a first base station is described. The apparatus may include a processor, memory coupled with the processor, and instructions stored in the memory. The instructions may be executable by the processor to cause the apparatus to identify a bandwidth part hopping pattern for a UE for communication with the first base station, and a set of switching timings for switching between different frequencies of a set of frequencies within a carrier bandwidth for the communications with the first base station, identify a measurement gap pattern for UE measurement of one or more reference signals from one or more neighboring base stations, the measurement gap pattern indicates a measurement gap length and a periodicity of repetitions of measurement gaps, adjust at least one of the set of switching timings to align with a reference point associated with the measurement gap pattern, and communicate with the UE using the bandwidth part hopping pattern according to the adjusted switching timings.

Another apparatus for wireless communication at a first base station is described. The apparatus may include means for identifying a bandwidth part hopping pattern for a UE for communication with the first base station, and a set of switching timings for switching between different frequencies of a set of frequencies within a carrier bandwidth for the communications with the first base station, means for identifying a measurement gap pattern for UE measurement of one or more reference signals from one or more neighboring base stations, the measurement gap pattern indicates a measurement gap length and a periodicity of repetitions of measurement gaps, means for adjusting at least one of the set of switching timings to align with a reference point associated with the measurement gap pattern, and means for communicating with the UE using the bandwidth part hopping pattern according to the adjusted switching timings.

A non-transitory computer-readable medium storing code for wireless communication at a first base station is described. The code may include instructions executable by a processor to identify a bandwidth part hopping pattern for a UE for communication with the first base station, and a set of switching timings for switching between different frequencies of a set of frequencies within a carrier bandwidth for the communications with the first base station, identify a measurement gap pattern for UE measurement of one or more reference signals from one or more neighboring base stations, the measurement gap pattern indicates a measurement gap length and a periodicity of repetitions of measurement gaps, adjust at least one of the set of switching timings to align with a reference point associated with the measurement gap pattern, and communicate with the UE using the bandwidth part hopping pattern according to the adjusted switching timings.

Some examples of the method, apparatuses, and non-transitory computer-readable medium described herein may further include operations, features, means, or instructions for transmitting, to the UE, information that indicates the bandwidth part hopping pattern and the measurement gap pattern, and where the reference point corresponds to an end time of a first measurement gap and a start time of a first frequency hop of the bandwidth part hopping pattern is aligned with the reference point, or the reference point corresponds to a start time of the first measurement gap and an end time of the first frequency hop is aligned with the reference point. In some examples of the method, apparatuses, and non-transitory computer-readable medium described herein, the bandwidth part hopping pattern and the measurement gap pattern share a common switching gap for switching between different frequencies at the UE.

In some examples of the method, apparatuses, and non-transitory computer-readable medium described herein, the reference point corresponds to a start time of a first measurement gap, and where the bandwidth part hopping pattern and the measurement gap pattern are selected to provide alignment of the reference point and an end time of a first frequency hop of the bandwidth part hopping pattern. In some examples of the method, apparatuses, and non-transitory computer-readable medium described herein, the reference point corresponds to an end time of a first measurement gap, and where the bandwidth part hopping pattern and the measurement gap pattern are selected to provide alignment of the reference point and a start time of a first frequency hop of the bandwidth part hopping pattern.

In some examples of the method, apparatuses, and non-transitory computer-readable medium described herein, the adjusting may include operations, features, means, or instructions for adjusting a duration of a first hop of the bandwidth part hopping pattern that overlaps with, or may be adjacent to, a first measurement gap of the measurement gap pattern, to provide alignment of the reference point with a start or end time of a first frequency hop of the bandwidth part hopping pattern. In some examples of the method, apparatuses, and non-transitory computer-readable medium described herein, the first hop precedes the first measurement gap, and an ending time of the first hop is extended to provide an ending time boundary that is aligned with the reference point. In some examples of the method, apparatuses, and non-transitory computer-readable medium described herein, the first hop overlaps the first measurement gap, and an ending time of the first hop is extended to provide an ending time boundary that corresponds to a subsequent hop to the first hop, and where a frequency switch associated with the subsequent hop is skipped. In some examples of the method, apparatuses, and non-transitory computer-readable medium described herein, the first hop follows the first measurement gap, and a starting time of the first hop is advanced to provide a starting time boundary that is aligned with the reference point.

In some examples of the method, apparatuses, and non-transitory computer-readable medium described herein, the adjusting may include operations, features, means, or instructions for determining whether to extend or shorten the duration of a subsequent hop to the first hop based on a non-overlapping duration of the first hop and the first measurement gap, a frequency separation from a prior hop of the bandwidth part hopping pattern that is prior to the first measurement gap, the duration of the first hop relative to a measurement gap duration, or any combinations thereof. In some examples of the method, apparatuses, and non-transitory computer-readable medium described herein, the adjusting may include operations, features, means, or instructions for adjusting a duration of a first hop of the bandwidth part hopping pattern to align an ending time of the first hop with the reference point and shifting subsequent hops to the first hop of the bandwidth part hopping pattern by an amount of the adjusted duration of the first hop, and where respective durations of the subsequent hops are unchanged.

DETAILED DESCRIPTION

Figure 1:
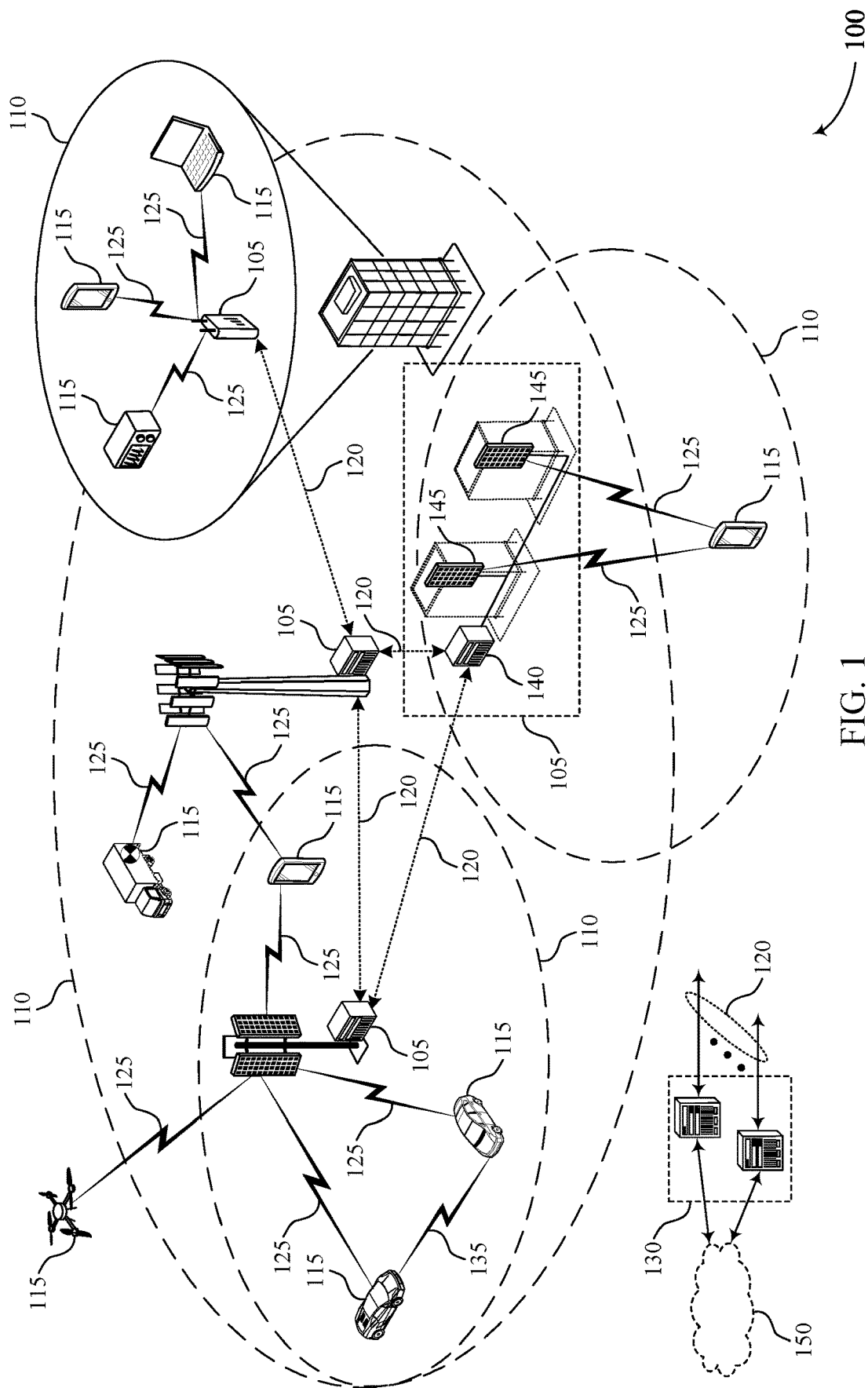
FIG. 1 illustrates an example of a wireless communications system that supports techniques for time alignment of measurement gaps and frequency hops in accordance with aspects of the present disclosure.

In some wireless communications systems, one or more devices may implement frequency hopping in which communications are transmitted using different frequencies according to a frequency hopping pattern. Such techniques may provide enhanced frequency diversity for communications, and enhance likelihood of successful decoding at a receiving device. For example, interference that may be present at a first frequency of a channel bandwidth may be reduced or not present at a second frequency of the channel bandwidth, and frequency hopping across frequencies within the channel bandwidth may reduce the likelihood that the interference of the first frequency renders a communication undecodable at a receiving device. When performing frequency hops, the transmitting device may have gaps in transmissions at frequency hop boundaries, that result from switching of radio frequency (RF) components from one frequency to a different frequency.

Additionally, in some cases a user equipment (UE) may be configured to perform measurements of signals from one or more neighboring base stations, and report the measurements to a serving base station. Such measurements may be made by the UE switching to a frequency associated with the neighboring base stations and making the measurements according to a measurement gap pattern. Such measurement gap pattern frequency switches may also result in switching gaps due to switching of RF components at the UE. Thus, in cases where a UE performs frequency switching according to the frequency hopping pattern as well as the measurement gap pattern, a relatively large number of switching gaps may be experienced at the UE, which increases power consumption and reduces communications efficiency.

In accordance with various aspects described herein, techniques are provided for identifying a frequency hopping pattern for communications between a UE and a base station, and also identifying a measurement gap pattern for measurement of one or more reference signals from one or more neighboring base stations. One or more switching timings of a set of switching timings of the frequency hopping pattern may be aligned with a reference point associated with the measurement gap pattern, which may provide aligned switching gaps in the frequency hopping pattern and the measurement gap pattern. In some cases, the frequency hopping pattern may be selected from a number of different available frequency hopping patterns such that at least one boundary associated with the set of switching timings is aligned with the reference point of the measurement gap pattern. In some cases, a duration of one or more frequency hops of the frequency hopping pattern may be adjusted such that at least one boundary associated with the set of switching timings is aligned with the reference point of the measurement gap pattern.

Particular aspects of the subject matter described herein may be implemented to realize one or more advantages. The described techniques may support improvements in communications in which one or more boundaries of a frequency hopping pattern is aligned with a reference point of a measurement gap pattern. For example, such techniques may reduce power consumption at a UE by providing fewer re-tuning gaps for RF components. Further, in some examples, the described techniques may enhance data rates, for control, data, or control and data, by providing fewer switching gaps which reduces overhead. As such, supported techniques may include improved network operations, and, in some examples, may promote network efficiencies and power reduction, among other benefits.

Aspects of the disclosure are initially described in the context of wireless communications systems. Aspects of the disclosure are further illustrated by and described with reference to hopping pattern alignment techniques, process flows, apparatus diagrams, system diagrams, and flowcharts that relate to techniques for time alignment of measurement gaps and frequency hops.

FIG. 1 illustrates an example of a wireless communications system 100 that supports techniques for time alignment of measurement gaps and frequency hops in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, one or more UEs 115 may be configured with a frequency hopping pattern for communication between the UE 115 and a base station 105, and also may be configured with a measurement gap pattern for measurement of one or more reference signals from one or more neighboring base stations 105. One or more switching timings of a set of switching timings of the frequency hopping pattern may be aligned with a reference point associated with the measurement gap pattern, which may provide aligned switching gaps in the frequency hopping pattern and the measurement gap pattern. In some cases, the frequency hopping pattern may be selected from a number of different available frequency hopping patterns such that at least one boundary associated with the set of switching timings is aligned with the reference point of the measurement gap pattern. In some cases, a duration of one or more frequency hops of the frequency hopping pattern may be adjusted such that at least one boundary associated with the set of switching timings is aligned with the reference point of the measurement gap pattern.

Figure 2:
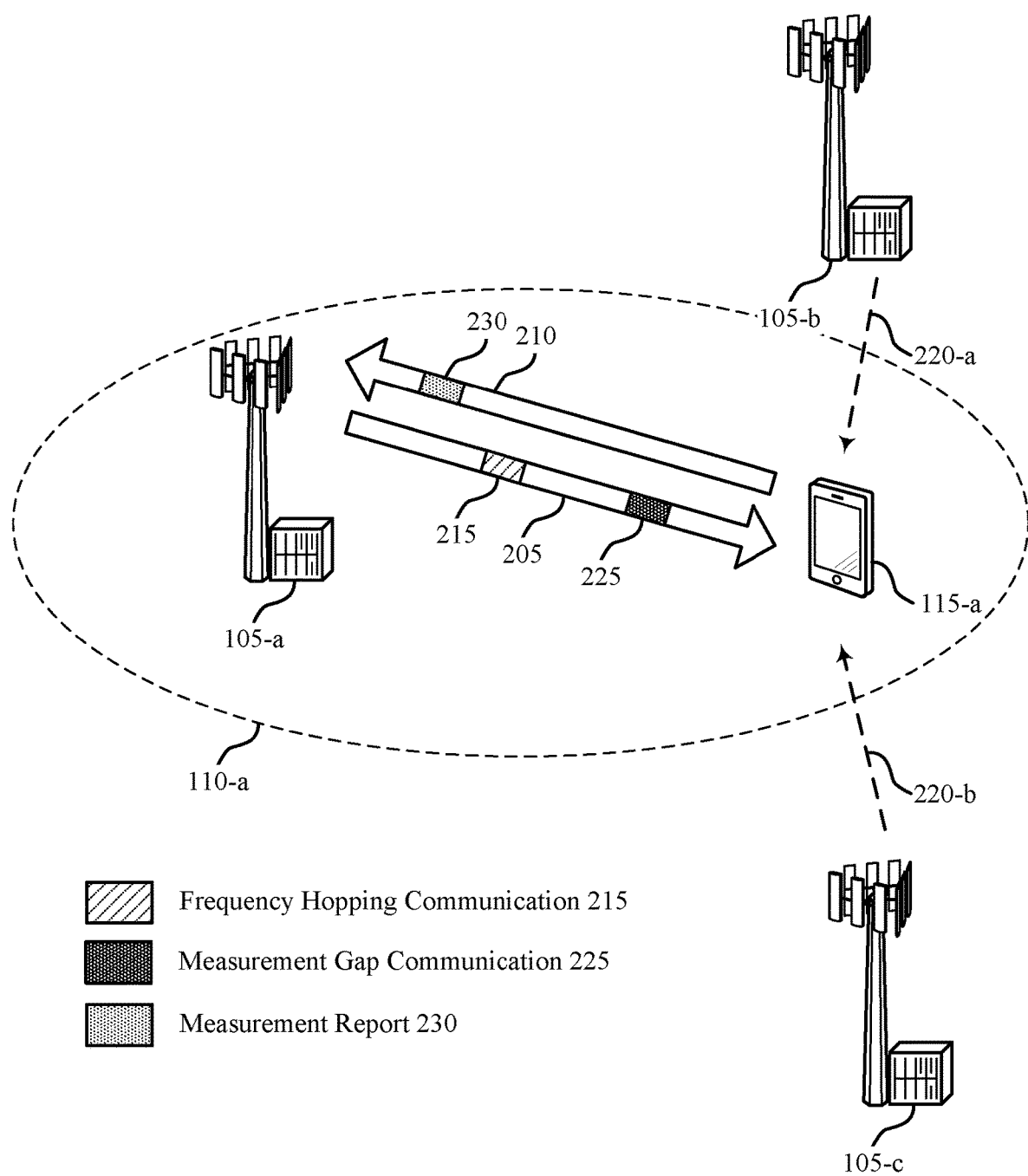
FIG. 2 illustrates an example of a portion of a wireless communications system that supports techniques for time alignment of measurement gaps and frequency hops in accordance with aspects of the present disclosure.

FIG. 2 illustrates an example of a wireless communications system 200 that supports techniques for time alignment of measurement gaps and frequency hops in accordance with aspects of the present disclosure. Wireless communications system 200 may include a serving base station 105-a (e.g., a base station 105 of FIG. 1) that may communicate with a UE 115-a (e.g., UEs 115 of FIG. 1) within coverage area 110-a. In this example, two neighboring base stations 105-b and 105-c may be in proximity to the UE 115-a, and the UE 115-a may be configured to measure one or more signals 220 of the neighboring base stations 105-b and 105-c.

The UE 115-a may communicate with the serving base station 105-a and receive downlink communications 205 on one or more downlink carriers, and transmit uplink communications 210 on one or more uplink carriers. In some cases, the serving base station 105-a may configure the UE 115-a with a frequency hopping pattern, and transmit frequency hopping communications 215 to the UE 115-a. For example, the UE 115-a may be a reduced capability device that has relaxed hardware requirements relative to non-reduced capability devices, for reduced cost and reduced functionality. Such a device may use a smaller channel bandwidth (e.g., a 20 MHz bandwidth) than standard capability UEs (e.g., that may use a 100 MHz channel bandwidth). In some cases, due to the bandwidth reduction, frequency hopping may be implemented in order to provide frequency diversity gains and reduce narrowband interference effects. While this example describes a reduced capability device, such techniques may be used in any devices, and the techniques discussed herein are not limited to reduced capability devices. An exemplary frequency hopping pattern is discussed with reference to FIG. 3.

Additionally, in some cases, the UE 115-a may be configured to measure signals 220 from the neighboring base stations 105-b and 105-c (e.g., signals transmitted in synchronization signal blocks (SSBs), or other reference signals, transmitted by the neighboring base stations 105-b and 105-c). In order to make such measurements, the UE 115-a may switch to a frequency of the one or more neighboring base stations 105-b and 105-c to perform neighbor cell measurements according to a measurement gap pattern. In such cases, measurement gap communications 225 may be allocated in which a measurement gap is provided corresponding to the measurement gap pattern. Based on measurements during the measurement gap, the UE 115-a may transmit a measurement report 230 to the serving base station 105-a. An example of a measurement gap pattern is discussed with reference to FIG. 4.

In cases where the UE 115-a uses both frequency hopping and performs neighbor cell measurements, frequency switching may be performed which results in gaps in communications at the UE 115-a while RF components are re-tuned to a different frequency. In cases where measurement gaps overlap with frequency hops of the frequency hopping pattern, the UE 115-a may need to perform additional frequency switches which consume overhead and power.

In accordance with techniques discussed herein, one or more switching timings of a set of switching timings of the frequency hopping pattern may be aligned with a reference point associated with the measurement gap pattern, which may provide aligned switching gaps in the frequency hopping pattern and the measurement gap pattern. In some cases, the frequency hopping pattern may be selected from a number of different available frequency hopping patterns such that at least one boundary associated with the set of switching timings is aligned with the reference point of the measurement gap pattern. In some cases, a duration of one or more frequency hops of the frequency hopping pattern may be adjusted such that at least one boundary associated with the set of switching timings is aligned with the reference point of the measurement gap pattern. Examples of switching timing alignments are described with reference to FIGS. 5 through 8.

Figure 3:
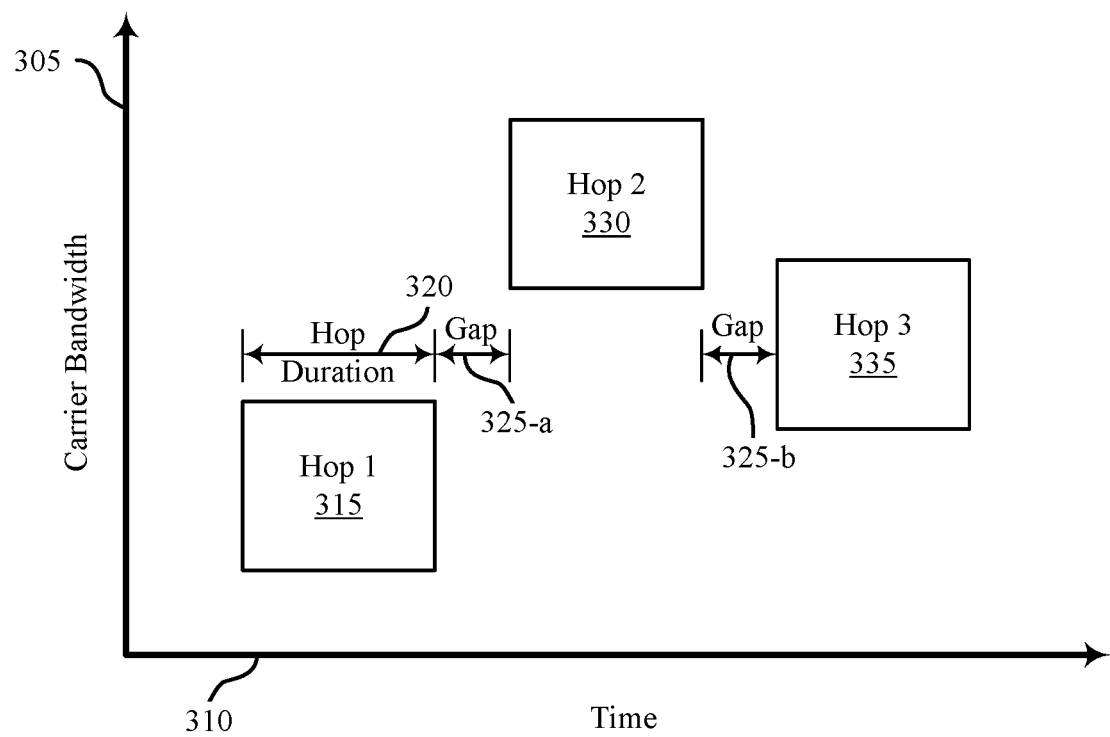
FIG. 3 illustrates an example of a frequency hopping pattern that supports techniques for time alignment of measurement gaps and frequency hops in accordance with aspects of the present disclosure.

FIG. 3 illustrates an example of a frequency hopping pattern 300 that supports techniques for time alignment of measurement gaps and frequency hops in accordance with aspects of the present disclosure. The example of FIG. 3 may be implemented in aspects of wireless communications systems 100 or 200 of FIG. 1 or 2. In the example of FIG. 3, UE may be configured with frequency hopping within a carrier bandwidth 305, in which frequency hops are performed in time 310 based on a configured frequency hopping pattern.

In this example, a first hop 315 (e.g. hop 1) may have a hop duration 320 and use a first frequency reference point within the carrier bandwidth 305. The UE may then switch to a second frequency reference point within the carrier bandwidth 305 for a second hop 330. A switching gap 325-a may be present between the first hop 315 and the second hop 330, in order to allow for re-tuning of RF components at the UE. The switching gap 325-a may have a duration sufficient to allow for switching of RF components and settling of any transients associated with the switching. In this example, a third hop 335 may commence after switching gap 325-b, and so on in accordance with the configured hopping pattern.

Figure 4:
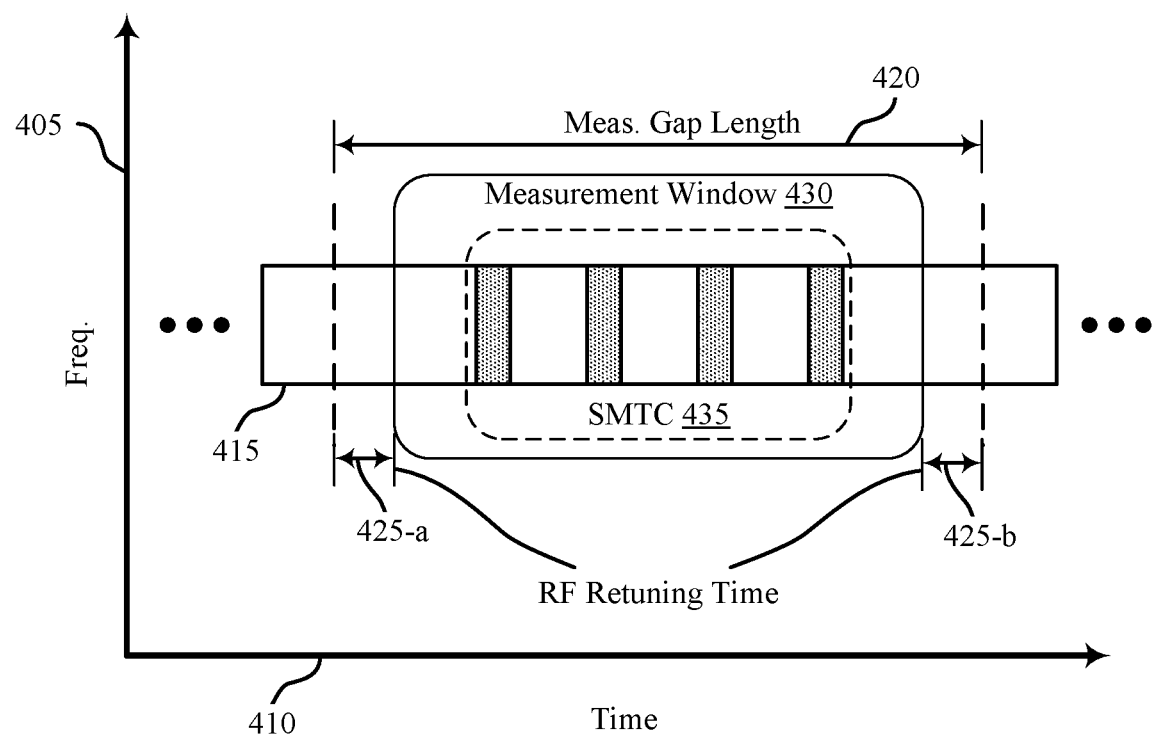
FIG. 4 illustrates an example of a measurement gap pattern that supports techniques for time alignment of measurement gaps and frequency hops in accordance with aspects of the present disclosure.

FIG. 4 illustrates an example of a measurement gap pattern 400 that supports techniques for time alignment of measurement gaps and frequency hops in accordance with aspects of the present disclosure. The example of FIG. 4 may be implemented in aspects of wireless communications systems 100 or 200 of FIG. 1 or 2. In the example of FIG. 4, UE may be configured with measurement gap pattern in which the UE may switch within a frequency band 405 at times 410 to measure one or more signals of one or more neighboring base stations.

In this example, the UE may switch to a frequency 415 during a measurement gap 420. Switching gaps 425-a and 425-b within the measurement gap 420 may provide for RF component retuning at the UE, and a measurement window 430 is defined between the switching gaps 425. Within the measurement window 430 is a SS/PBCH Block Measurement Timing Configuration (SMTC) duration 435 during which the UE may measure one or more signals. For example, the UE may performs SSB based RSRP, RSRQ and SINR measurements. Measurement gaps 420 may be configured to identify and measure intra-frequency and/or inter-frequency cells. In some cases, the UE may be configured with a single UE specific measurement gap pattern or per-FR measurement gap patterns, depending on UE capability. Each measurement gap pattern may have an associated with gap pattern ID that has a measurement gap length (MGL) and measurement gap repetition period (MGRP). In cases where a UE is configured with both a frequency hopping pattern and a measurement gap pattern, RF retuning times may be unaligned and, as discussed herein, techniques to provide alignment of at least some of the RF switching gaps are provided.

Figure 5:
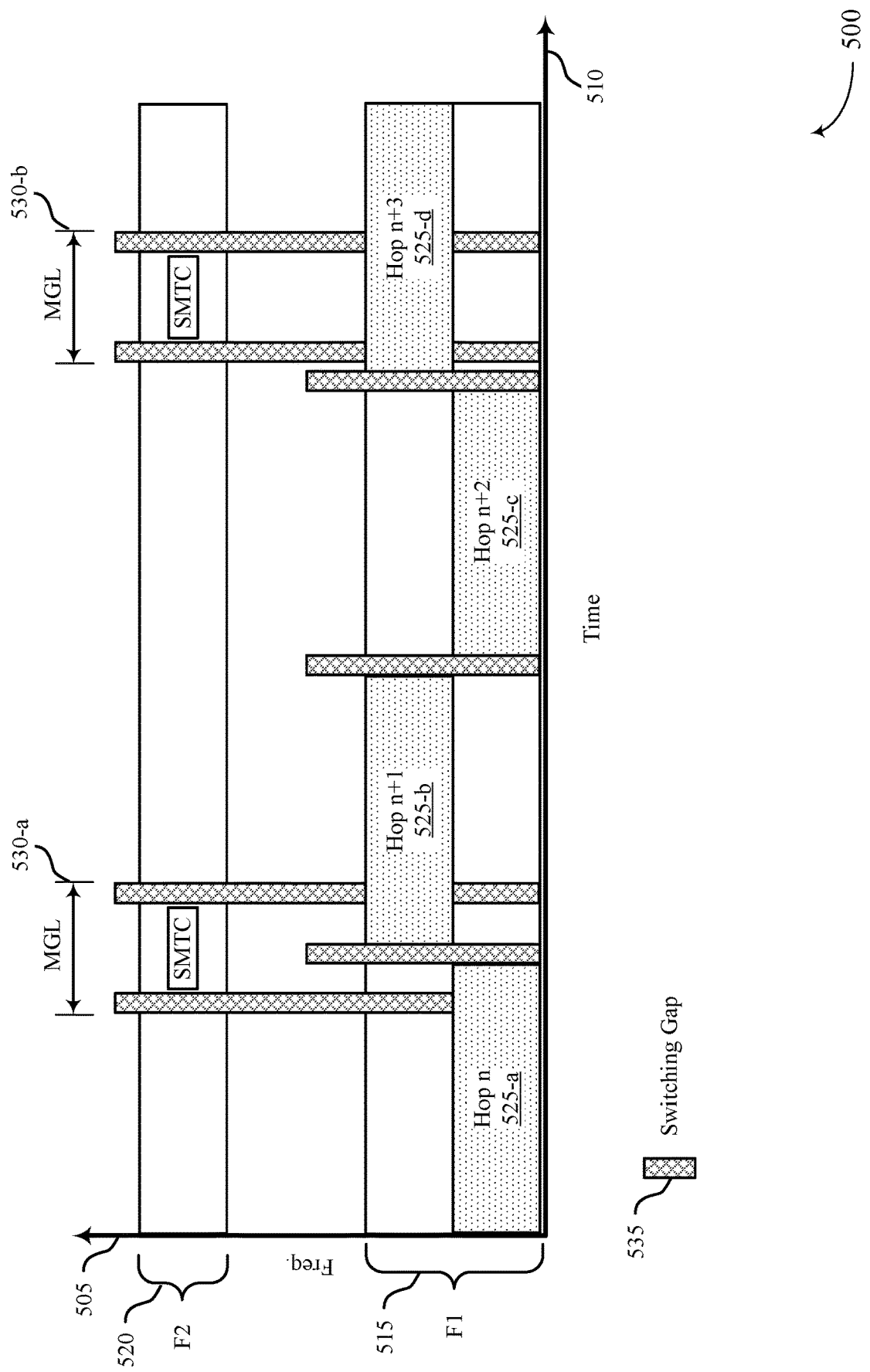
FIGS. 5 through 8 illustrate examples of time alignment techniques of measurement gaps and frequency hops in accordance with aspects of the present disclosure.

FIG. 5 illustrates an example of a time alignment technique 500 that for time alignment of measurement gaps and frequency hops in accordance with aspects of the present disclosure. The example of FIG. 5 may be implemented in aspects of wireless communications systems 100 or 200 of FIG. 1 or 2. In the example of FIG. 5, UE may be configured with measurement gap pattern and a hopping pattern within frequencies 505 and time 510.

In this example, a hopping pattern may be configured within a channel bandwidth 515 (e.g., which may also be referred to as a bandwidth part), and a measurement gap pattern may be configured for a measurement frequency 520. The hopping pattern may define periodic frequency hops 525 within the channel bandwidth 515. In this example, two frequencies are alternated in the hopping pattern, although other hopping patterns may have more frequencies that are used for frequency hopping, with two frequencies illustrated here for purposes of illustration and discussion. The measurement gap pattern may define a measurement gap length 530 with a corresponding measurement window and SMTC. In this example, switching gaps 535 are present at each boundary of the frequency hops 525 and measurement gap lengths 530. Further, the hop duration of frequency hops 525 may be larger or smaller than the measurement gap length 530, and the bandwidth part hops 525 may not be aligned with the measurement gaps in time.

In the example of FIG. 5, the measurement gap length 530 is less than a hop duration, but in other examples it may be longer that the hop duration such that a single measurement gap partially or completely overlaps with two or more hops. In the example of FIG. 5, the measurement gap length 530 is less than the hop duration such that a single measurement gap is within a hop 525 (e.g., measurement gap length 530-b is within hop 525-d) or partially overlaps with two hops 525 (e.g., measurement gap length 530-a is overlaps with hop 525-a and hop 525-b). In this example, none of the switching gaps 535 are aligned, such that multiple redundant RF retuning is present, which may cause additional interruptions at the UE. In some cases, the UE or a base station may align switching gaps 535 such that at least some of the switching gaps 535 for the hopping pattern and the measurement gap pattern are aligned.

Figure 6:
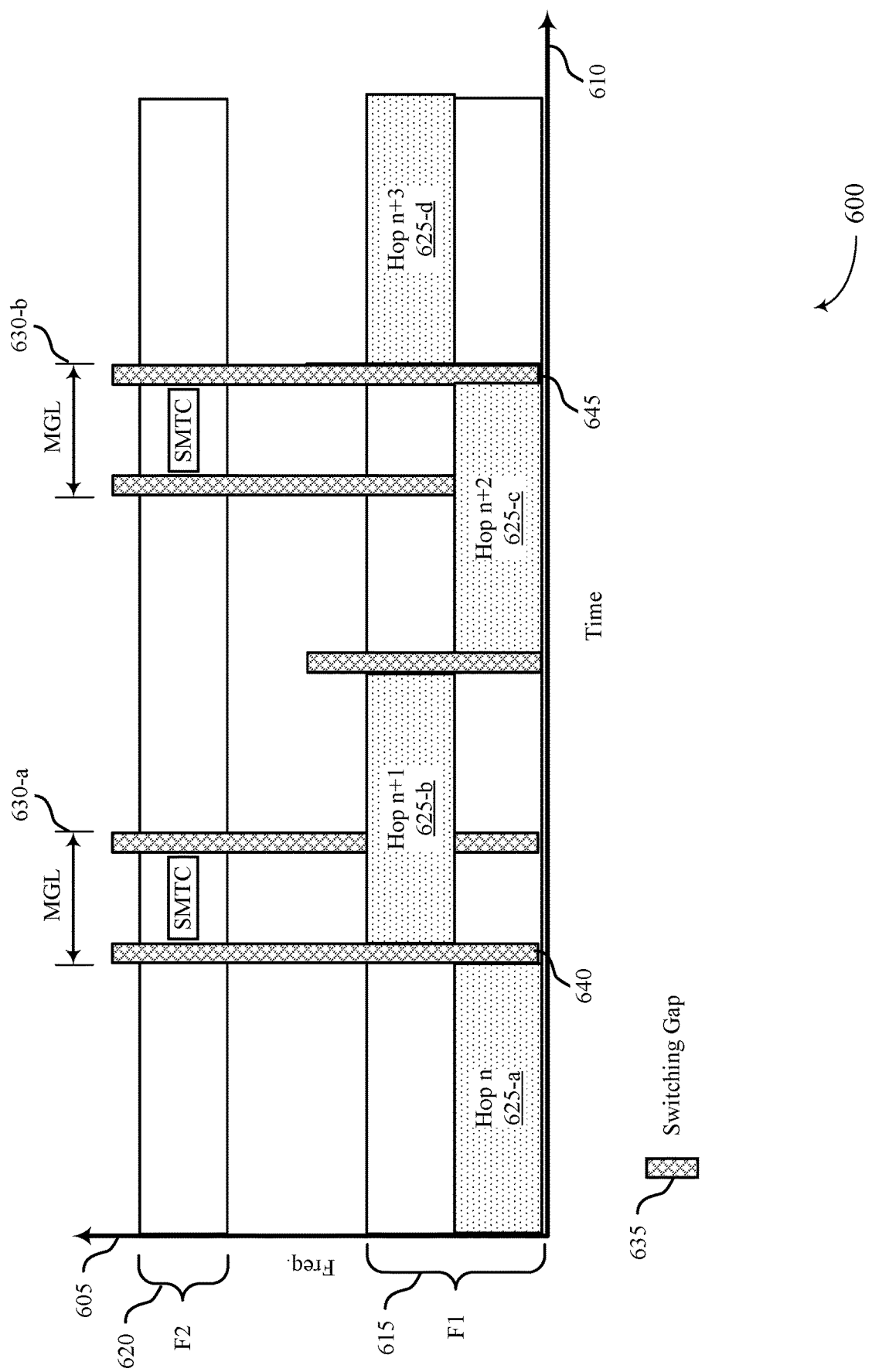

FIG. 6 illustrates an example of a time alignment techniques 600 that supports techniques for time alignment of measurement gaps and frequency hops in accordance with aspects of the present disclosure. The example of FIG. 6 may be implemented in aspects of wireless communications systems 100 or 200 of FIG. 1 or 2. In the example of FIG. 6, UE may be configured with measurement gap pattern and a hopping pattern within frequencies 605 and time 610.

In this example, a hopping pattern may be configured within a channel bandwidth 615, and a measurement gap pattern may be configured for a measurement frequency 620. The hopping pattern may define periodic frequency hops 625 within the channel bandwidth 615. In this example, two frequencies are alternated in the hopping pattern, although other hopping patterns may have more frequencies that are used for frequency hopping, with two frequencies illustrated here for purposes of illustration and discussion. The measurement gap pattern may define a measurement gap length 630 with a corresponding measurement window and SMTC. In this example, switching gaps 635 are present at each boundary of the frequency hops 625 and measurement gap lengths 630.

In this example, time alignment of switching gaps at 640 and 645 may be achieved by selecting a hopping pattern from a plurality of available hopping patterns such that beginning of measurement gap length 630-a is aligned with the end of a first hop 625-a. In some cases, the hopping pattern may be selected such that each measurement gap length 630 is aligned such that the beginning of the gap (e.g., a reference point of the measurement gap pattern) is aligned with the end of a hop 625. In other cases, the hopping pattern and/or the measurement gap pattern can be selected such that the end of the measurement gap length 630 is aligned with the beginning of the following hop, such as illustrated at the end of measurement gap length 630-b that is aligned with the beginning of hop 625-d such that switching gap 645 is shared by both the measurement gap and hop switching duration. Such techniques may allow for the RF-retuning time due to narrow BWP switching to be contained within the RF-retuning time of measurement gaps either at the beginning or end of the measurement gap, thus avoiding half of the redundant RF-retuning. In other examples, such as illustrated in FIGS. 7 and 8, adjustments may be made to a hopping pattern to provide alignment of switching gaps.

Figure 7:
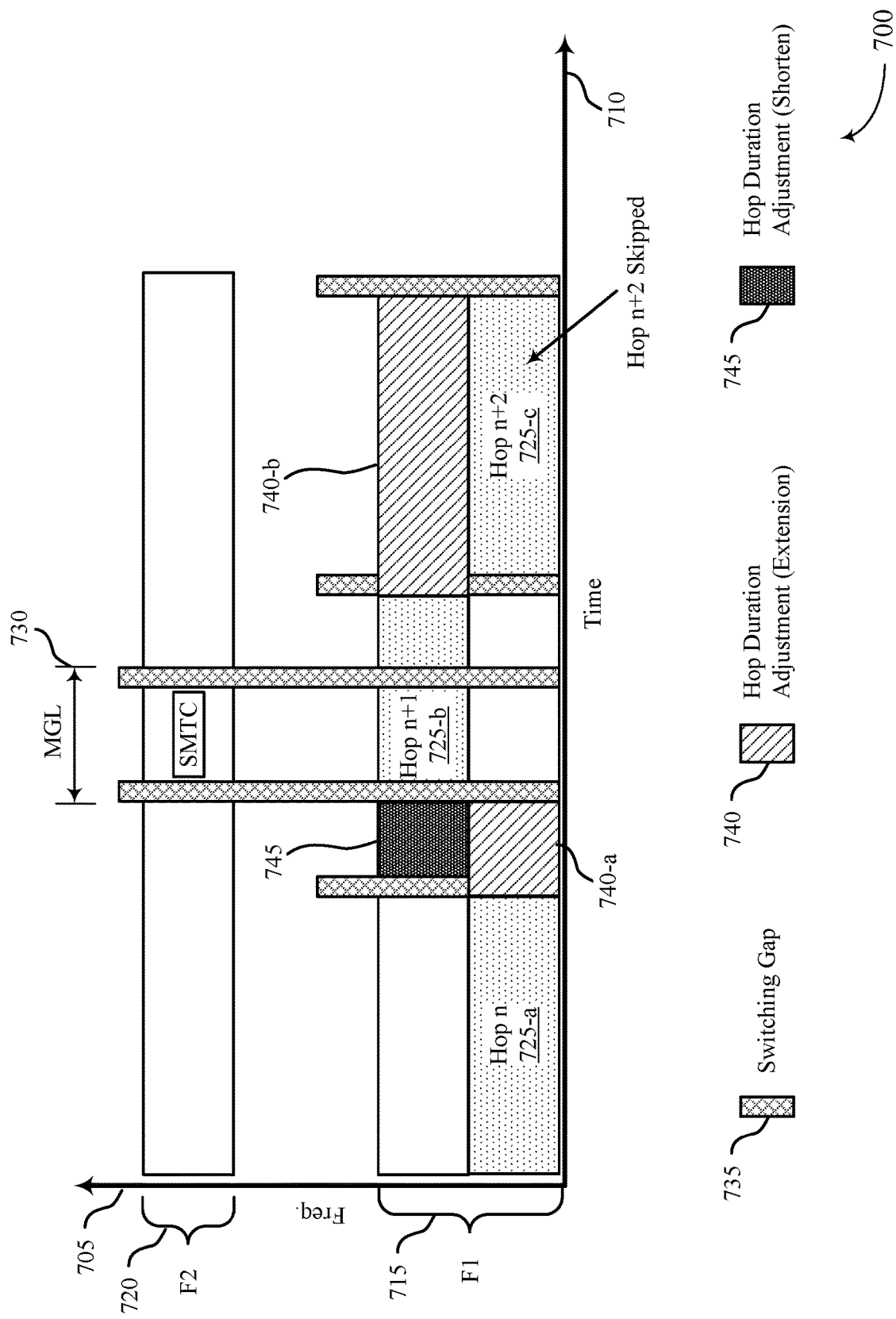
Figure 8:
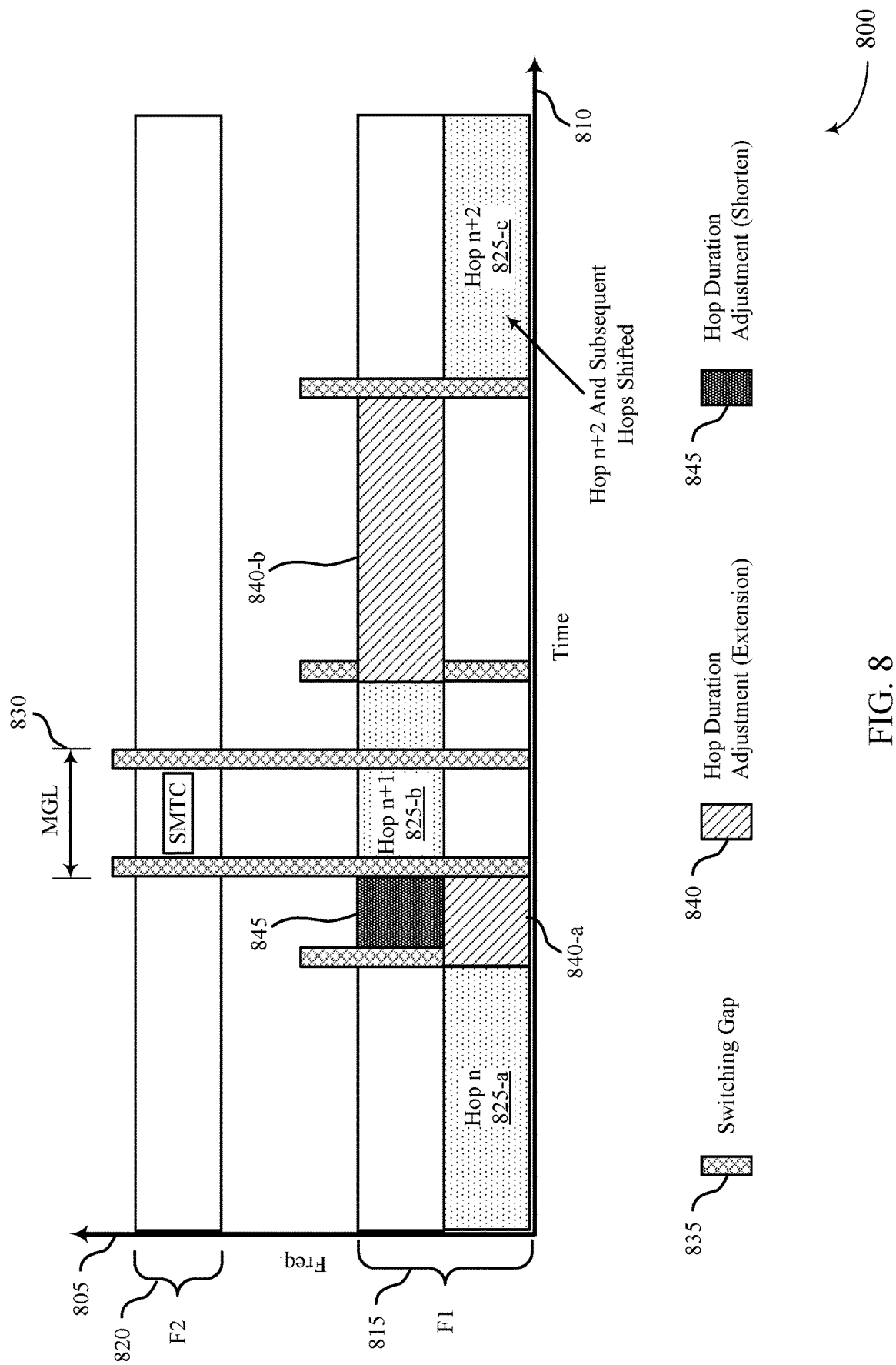

FIG. 7 illustrates an example time alignment technique 700 for time alignment of measurement gaps and frequency hops in accordance with aspects of the present disclosure. The example of FIG. 7 may be implemented in aspects of wireless communications systems 100 or 200 of FIG. 1 or 2. In the example of FIG. 7, UE may be configured with measurement gap pattern and a hopping pattern within frequencies 705 and time 710.

In this example, a hopping pattern may be configured within a channel bandwidth 715, and a measurement gap pattern may be configured for a measurement frequency 720. The hopping pattern may define periodic frequency hops 725 within the channel bandwidth 715. In this example, two frequencies are alternated in the hopping pattern, although other hopping patterns may have more frequencies that are used for frequency hopping, with two frequencies illustrated here for purposes of illustration and discussion. The measurement gap pattern may define a measurement gap length 730 with a corresponding measurement window and SMTC. In this example, switching gaps 735 are present at each boundary of the frequency hops 725 and measurement gap lengths 730.

In this example, time alignment of switching gaps 735 may be achieved by providing one or more elastic hops in which a duration of a hop 725 may be adjusted. In this example, a hop duration adjustment 740 may be made to a hop 725 to extend a duration of the hop 725. For example, the measurement gap length 730 may start after a starting boundary of second hop 725-b based on the configured hopping pattern. In this case, a duration of a first hop 725-a may be extended at hop duration adjustment 740-a such that the first hop 725-a ends at a starting time of the measurement gap length 730. In such a case, the second hop 725-b may have a hop duration adjustment 745 that shortens the respective hop duration. Further, in this example, the second hop 725-b may also have hop duration adjustment 740-b to extend the duration of the hop to cover the entire duration of a subsequent hop (e.g. the duration of third hop 725-c in this example) such that the subsequent hop is skipped. Thus, such elastic hops may be extended or shortened in time to align with the measurement gap boundary, which allows RF retuning due to narrow BWP switching, for at least one hop boundary, to be within the RF re-tuning time of the respective measurement gap. Hop extension or shortening may be implemented in multiple ways, and the illustration of FIG. 7 is just a single example for purposes of discussion and illustration. In other examples, the second hop 725-b may be shortened at the beginning and at the end, such that the second hop 725-b is skipped and the third hop 725-c is extended such that its starting time is aligned with an end time of the measurement gap length 730. In some cases, the UE and base station may have established criteria for selecting which hops 725 are to be extended or shortened. For example, hop duration extension or reduction may be based on a non-overlapping hop duration with the measurement gap length 730, a frequency separation from the previous active hop 725 (e.g., the hop before the measurement gap), or a relative duration of the measurement gap length 730 with the hop duration (e.g., hops which are completely overlapping with the MGL may be skipped), for example. In some cases, subsequent hops of the hopping pattern may be adjusted based on an adjustment of one of the hop durations, such as is illustrated in the example of FIG. 8.

FIG. 8 illustrates an example of a time alignment techniques 800 that supports techniques for time alignment of measurement gaps and frequency hops in accordance with aspects of the present disclosure. The example of FIG. 8 may be implemented in aspects of wireless communications systems 100 or 200 of FIG. 1 or 2. In the example of FIG. 8, UE may be configured with measurement gap pattern and a hopping pattern within frequencies 805 and time 810.

In this example, a hopping pattern may be configured within a channel bandwidth 815, and a measurement gap pattern may be configured for a measurement frequency 820. The hopping pattern may define periodic frequency hops 825 within the channel bandwidth 815. In this example, two frequencies are alternated in the hopping pattern, although other hopping patterns may have more frequencies that are used for frequency hopping, with two frequencies illustrated here for purposes of illustration and discussion. The measurement gap pattern may define a measurement gap length 830 with a corresponding measurement window and SMTC. In this example, switching gaps 835 are present at each boundary of the frequency hops 825 and measurement gap lengths 830.

In this example, time alignment of switching gaps 835 may be achieved by providing one or more elastic hops in which a duration of a hop 825 may be adjusted, and subsequent hops may be shifted in time. In this example, a hop duration adjustment 840 may be made to a hop 825 to extend a duration of the hop 825. For example, the measurement gap length 830 may start after a starting boundary of second hop 825-b based on the configured hopping pattern. In this case, a duration of a first hop 825-a may be extended at hop duration adjustment 840-a such that the first hop 825-a ends at a starting time of the measurement gap length 830. In such a case, the second hop 825-b may have a hop duration adjustment 845 that shortens the respective hop duration. In this example, the second hop 825-b may also have a hop duration adjustment 840-b to extend a duration of the hop 825-b until the end of a subsequent hop. In this example, the subsequent third hop 825-c of the hopping pattern may be shifted to have a starting time that is after a switching gap 835 of the adjusted second hop 825-b. Thus, the hops 825 that follow the adjusted hop 825-b are shifted in time without changing their duration.

Figure 9:
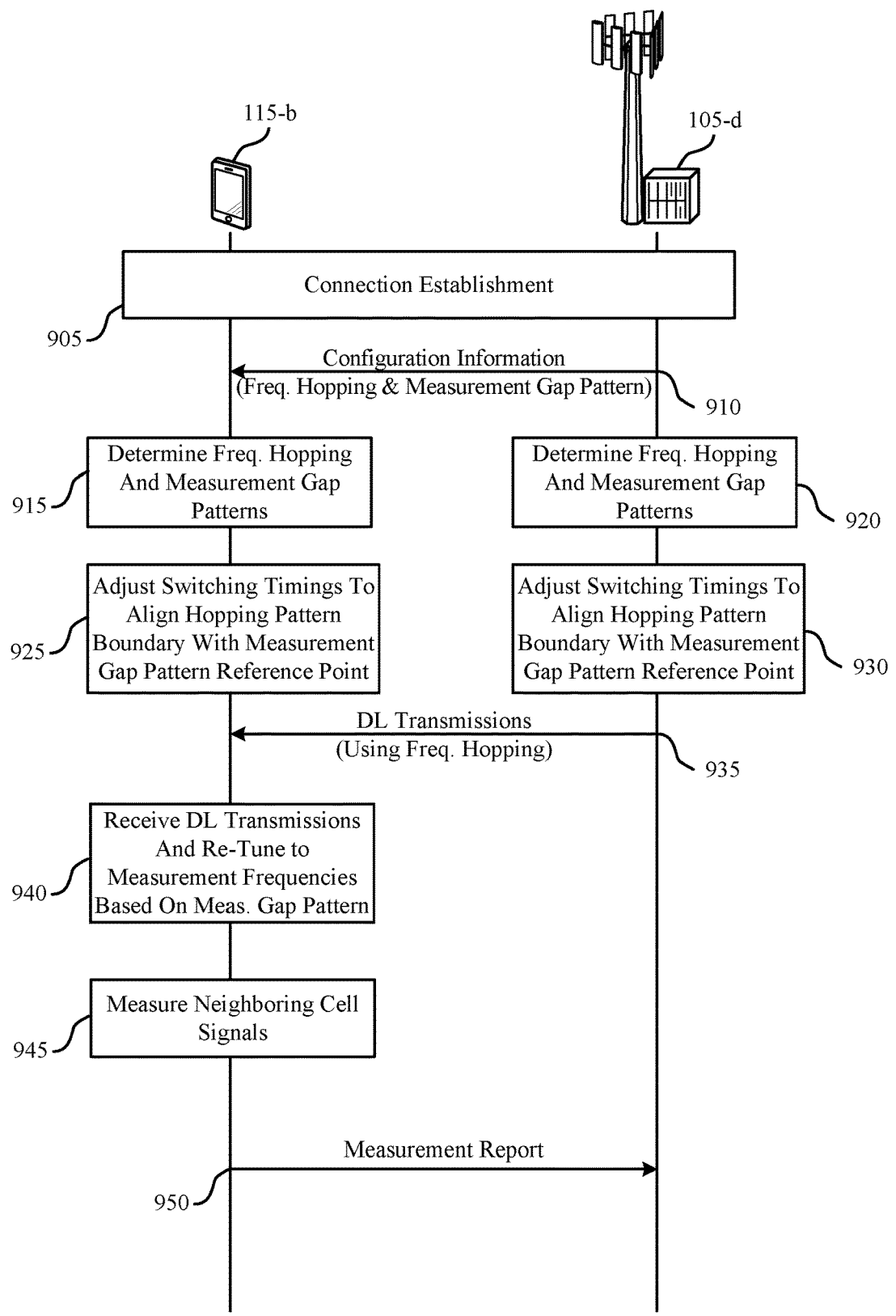
FIG. 9 illustrates an example of a process flow that supports techniques for time alignment of measurement gaps and frequency hops in accordance with aspects of the present disclosure.

FIG. 9 illustrates an example of a process flow 900 that supports techniques for time alignment of measurement gaps and frequency hops in accordance with aspects of the present disclosure. In some examples, process flow 900 may implement aspects of wireless communications system 100 or 200. Generally, the process flow 900 may illustrate the use of time alignment techniques for alignment of switching times of a measurement gap pattern and frequency hopping pattern for UE 115-b in communications with a base station 105-d. It is to be understood that the operations shown in the process flow 900 may be performed in a different order, operations performed at one device may be performed at another device, some operations may be removed, or additional operations may be performed.

At 905, the UE 115-b and base station 105-d may establish a connection. Such a connection may be established in accordance with connection establishment techniques in a NR system, for example.

At 910, the base station 105-d may transmit configuration information to the UE 115-b, which may include information related to a frequency hopping pattern and a measurement gap pattern. At 915, the UE 115-b may determine the frequency hopping pattern and measurement gap pattern based on the configuration information. Similarly, at 920, the base station 105-d may determine the frequency hopping pattern and measurement gap pattern according to the configuration information.

At 925, the UE 115-b may adjust switching timings to align at least one switching time of a set of switching times of the hopping pattern to align with a measurement gap pattern reference point. As discussed with reference to FIGS. 6 through 8, such adjustments may extend or reduce a duration of one or more hops of the hopping pattern, shift one or more hops of the hopping pattern, or combinations thereof. Likewise, at 930, the base station 105-*d* may adjust switching timings to align at least one switching time of a set of switching times of the hopping pattern to align with a measurement gap pattern reference point.

At 935, the base station 105-*d* may transmit one or more downlink transmissions to the UE 115-*b* using frequency hopping. In the downlink transmissions, one or more hops of the frequency hopping pattern may be adjusted in accordance with techniques as discussed herein. At 940, the UE 115-*b* may receive the downlink transmissions in accordance with the adjusted hopping pattern, and may periodically retune to measurement frequencies based on the measurement gap pattern, and at 945 may measure one or more signals from one or more neighboring base stations. At 950, the UE 115-*b* may transmit a measurement report to the base station 105-*d*.

Figure 10:
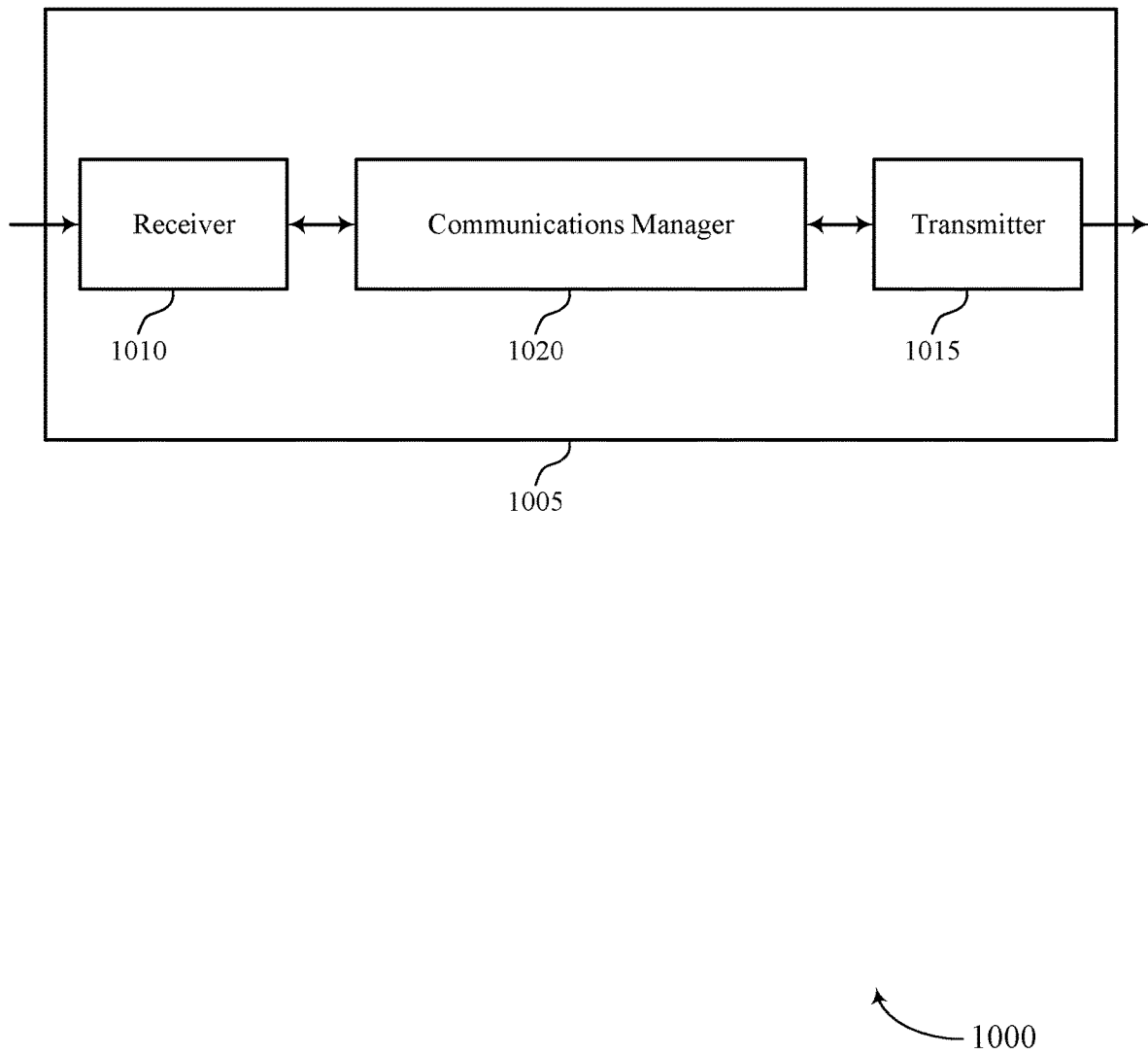
FIGS. 10 and 11 show block diagrams of devices that support techniques for time alignment of measurement gaps and frequency hops in accordance with aspects of the present disclosure.

FIG. 10 shows a block diagram 1000 of a device 1005 that supports techniques for time alignment of measurement gaps and frequency hops in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for time alignment of measurement gaps and frequency hops). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for time alignment of measurement gaps and frequency hops). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for time alignment of measurement gaps and frequency hops as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. For example, the communications manager 1020 may be configured as or otherwise support a means for identifying a bandwidth part hopping pattern for communication with a first base station, and a set of switching timings for switching between different frequencies of a set of frequencies within a carrier bandwidth for the communications with the first base station. The communications manager 1020 may be configured as or otherwise support a means for identifying a measurement gap pattern for measurement of one or more reference signals from one or more neighboring base stations, the measurement gap pattern indicates a measurement gap length and a periodicity of repetitions of measurement gaps. The communications manager 1020 may be configured as or otherwise support a means for adjusting at least one of the set of switching timings to align with a reference point associated with the measurement gap pattern. The communications manager 1020 may be configured as or otherwise support a means for communicating with the first base station using the bandwidth part hopping pattern according to the adjusted switching timings. The communications manager 1020 may be configured as or otherwise support a means for measuring the one or more reference signals from the one or more neighboring base stations according to the measurement gap pattern.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for alignment of one or more boundaries of a frequency hopping pattern with a reference point of a measurement gap pattern. Such techniques may reduce power consumption at a UE by providing fewer retuning gaps for RF components, may enhance data rates by providing fewer switching gaps, or any combinations thereof. As such, supported techniques may include improved network operations, and, in some examples, may promote network efficiencies and power reduction, among other benefits.

Figure 11:
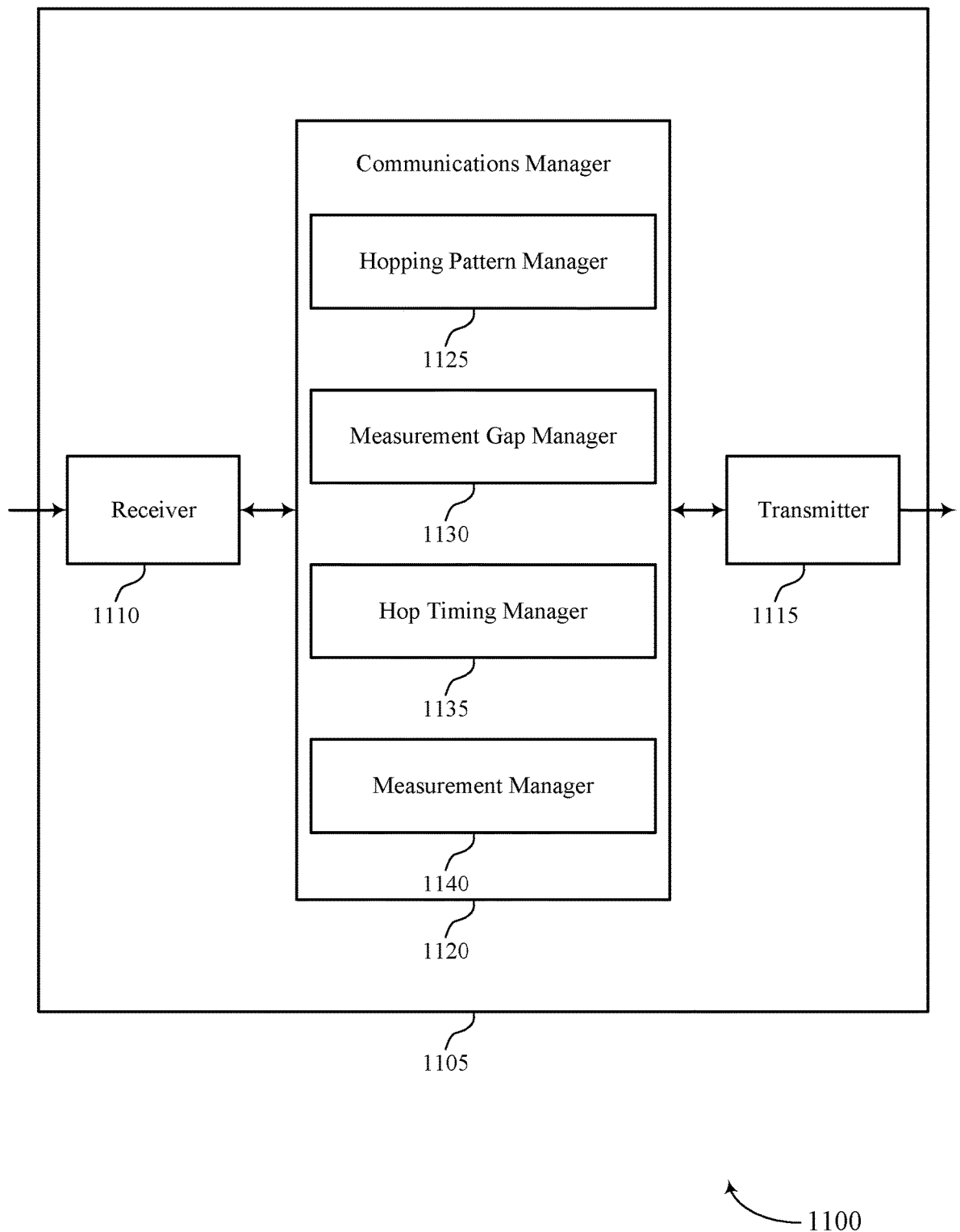

FIG. 11 shows a block diagram 1100 of a device 1105 that supports techniques for time alignment of measurement gaps and frequency hops in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for time alignment of measurement gaps and frequency hops). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for time alignment of measurement gaps and frequency hops). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for time alignment of measurement gaps and frequency hops as described herein. For example, the communications manager 1120 may include a hopping pattern manager 1125, a measurement gap manager 1130, a hop timing manager 1135, a measurement manager 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. The hopping pattern manager 1125 may be configured as or otherwise support a means for identifying a bandwidth part hopping pattern for communication with a first base station, and a set of switching timings for switching between different frequencies of a set of frequencies within a carrier bandwidth for the communications with the first base station. The measurement gap manager 1130 may be configured as or otherwise support a means for identifying a measurement gap pattern for measurement of one or more reference signals from one or more neighboring base stations, the measurement gap pattern indicates a measurement gap length and a periodicity of repetitions of measurement gaps. The hop timing manager 1135 may be configured as or otherwise support a means for adjusting at least one of the set of switching timings to align with a reference point associated with the measurement gap pattern. The hopping pattern manager 1125 may be configured as or otherwise support a means for communicating with the first base station using the bandwidth part hopping pattern according to the adjusted switching timings. The measurement manager 1140 may be configured as or otherwise support a means for measuring the one or more reference signals from the one or more neighboring base stations according to the measurement gap pattern.

Figure 12:
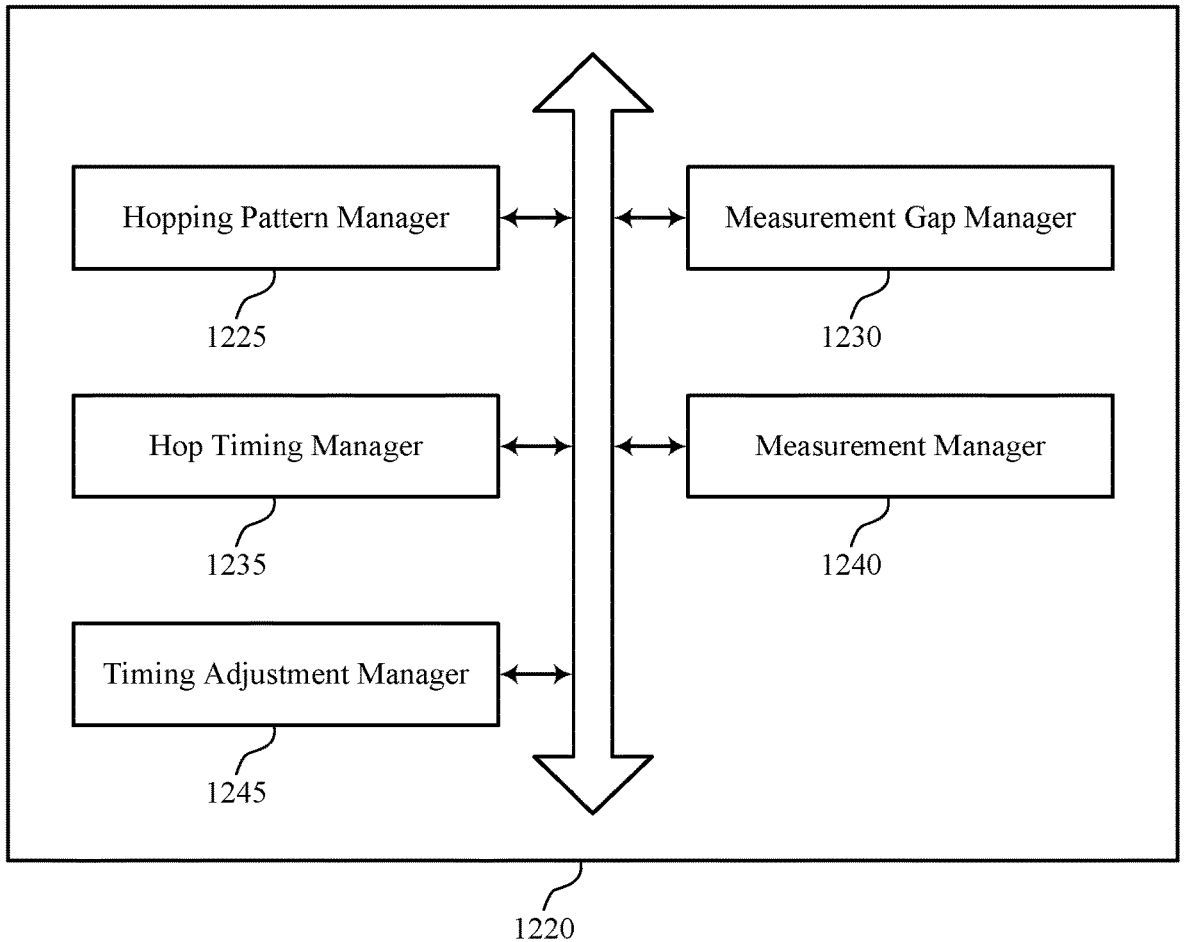
FIG. 12 shows a block diagram of a communications manager that supports techniques for time alignment of measurement gaps and frequency hops in accordance with aspects of the present disclosure.

FIG. 12 shows a block diagram 1200 of a communications manager 1220 that supports techniques for time alignment of measurement gaps and frequency hops in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for time alignment of measurement gaps and frequency hops as described herein. For example, the communications manager 1220 may include a hopping pattern manager 1225, a measurement gap manager 1230, a hop timing manager 1235, a measurement manager 1240, a timing adjustment manager 1245, or any combination thereof. Each of these components may communicate, directly or indirectly, with one another (e.g., via one or more buses).

The communications manager 1220 may support wireless communication at a UE in accordance with examples as disclosed herein. The hopping pattern manager 1225 may be configured as or otherwise support a means for identifying a bandwidth part hopping pattern for communication with a first base station, and a set of switching timings for switching between different frequencies of a set of frequencies within a carrier bandwidth for the communications with the first base station. The measurement gap manager 1230 may be configured as or otherwise support a means for identifying a measurement gap pattern for measurement of one or more reference signals from one or more neighboring base stations, the measurement gap pattern indicates a measurement gap length and a periodicity of repetitions of measurement gaps. The hop timing manager 1235 may be configured as or otherwise support a means for adjusting at least one of the set of switching timings to align with a reference point associated with the measurement gap pattern. In some examples, the hopping pattern manager 1225 may be configured as or otherwise support a means for communicating with the first base station using the bandwidth part hopping pattern according to the adjusted switching timings. The measurement manager 1240 may be configured as or otherwise support a means for measuring the one or more reference signals from the one or more neighboring base stations according to the measurement gap pattern.

In some examples, the hopping pattern manager 1225 may be configured as or otherwise support a means for receiving, from the first base station, information that indicates the bandwidth part hopping pattern and the measurement gap pattern, and where the reference point corresponds to an end time of a first measurement gap and a start time of a first frequency hop of the bandwidth part hopping pattern is aligned with the reference point, or the reference point corresponds to a start time of the first measurement gap and an end time of the first frequency hop that is aligned with the reference point.

In some examples, the bandwidth part hopping pattern and the measurement gap pattern share a common switching gap for retuning to a different frequency at the UE. In some examples, the reference point corresponds to a start time of a first measurement gap, and where the bandwidth part hopping pattern and the measurement gap pattern are selected to provide alignment of the reference point and an end time of a first frequency hop of the bandwidth part hopping pattern. In some examples, the reference point corresponds to an end time of a first measurement gap, and where the bandwidth part hopping pattern and the measurement gap pattern are selected to provide alignment of the reference point and a start time of a first frequency hop of the bandwidth part hopping pattern.

In some examples, to support adjusting, the timing adjustment manager 1245 may be configured as or otherwise support a means for adjusting a duration of a first hop of the bandwidth part hopping pattern that overlaps with, or is adjacent to, a first measurement gap of the measurement gap pattern, to provide alignment of the reference point with a start or end time of a first frequency hop of the bandwidth part hopping pattern. In some examples, the first hop precedes the first measurement gap, and an ending time of the first hop is extended to provide an ending time boundary that is aligned with the reference point. In some examples, the first hop overlaps the first measurement gap, and an ending time of the first hop is extended to provide an ending time boundary that corresponds to a subsequent hop to the first hop, and where a frequency switch associated with the subsequent hop is skipped. In some examples, the first hop follows the first measurement gap, and a starting time of the first hop is advanced to provide a starting time boundary that is aligned with the reference point.

In some examples, to support adjusting, the timing adjustment manager 1245 may be configured as or otherwise support a means for determining whether to extend or shorten a duration of a subsequent hop to the first hop based on a non-overlapping duration of the first hop and the first measurement gap, a frequency separation from a prior hop of the bandwidth part hopping pattern that is prior to the first measurement gap, the duration of the first hop relative to a measurement gap duration, or any combinations thereof.

In some examples, to support adjusting, the timing adjustment manager 1245 may be configured as or otherwise support a means for adjusting a duration of a first hop of the bandwidth part hopping pattern to align an ending time of the first hop with the reference point. In some examples, to support adjusting, the timing adjustment manager 1245 may be configured as or otherwise support a means for shifting subsequent hops to the first hop of the bandwidth part hopping pattern by an amount of the adjusted duration of the first hop, and where respective durations of the subsequent hops are unchanged.

Figure 13:
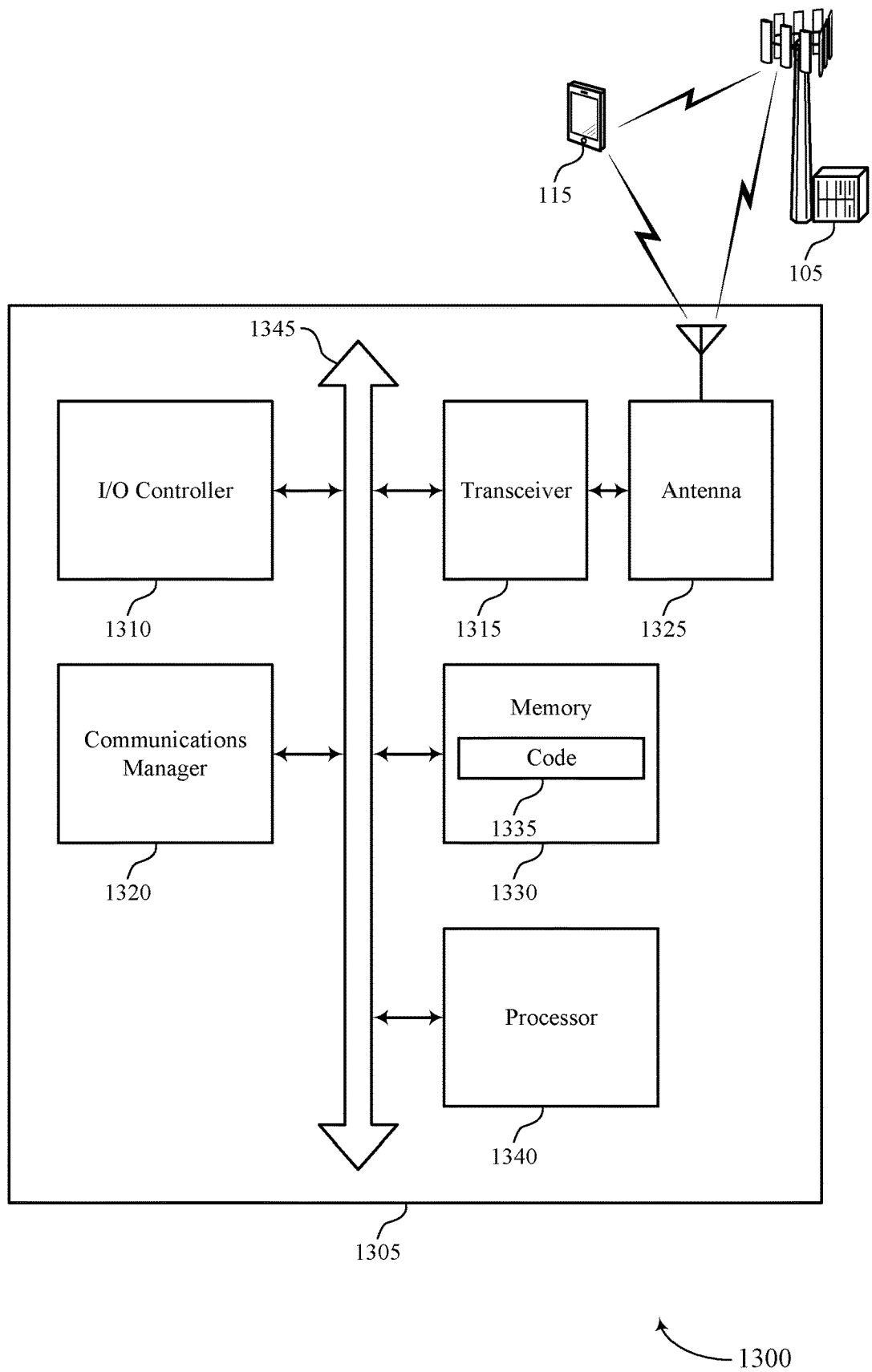
FIG. 13 shows a diagram of a system including a device that supports techniques for time alignment of measurement gaps and frequency hops in accordance with aspects of the present disclosure.

FIG. 13 shows a diagram of a system 1300 including a device 1305 that supports techniques for time alignment of measurement gaps and frequency hops in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for time alignment of measurement gaps and frequency hops). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at a UE in accordance with examples as disclosed herein. For example, the communications manager 1320 may be configured as or otherwise support a means for identifying a bandwidth part hopping pattern for communication with a first base station, and a set of switching timings for switching between different frequencies of a set of frequencies within a carrier bandwidth for the communications with the first base station. The communications manager 1320 may be configured as or otherwise support a means for identifying a measurement gap pattern for measurement of one or more reference signals from one or more neighboring base stations, the measurement gap pattern indicates a measurement gap length and a periodicity of repetitions of measurement gaps. The communications manager 1320 may be configured as or otherwise support a means for adjusting at least one of the set of switching timings to align with a reference point associated with the measurement gap pattern. The communications manager 1320 may be configured as or otherwise support a means for communicating with the first base station using the bandwidth part hopping pattern according to the adjusted switching timings. The communications manager 1320 may be configured as or otherwise support a means for measuring the one or more reference signals from the one or more neighboring base stations according to the measurement gap pattern.

By including or configuring the communications manager 1320 in accordance with examples as described herein, the device 1305 may support techniques for alignment of one or more boundaries of a frequency hopping pattern with a reference point of a measurement gap pattern. Such techniques may reduce power consumption at a UE by providing fewer retuning gaps for RF components, may enhance data rates by providing fewer switching gaps, or any combinations thereof. As such, supported techniques may include improved network operations, and, in some examples, may promote network efficiencies and power reduction, among other benefits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for time alignment of measurement gaps and frequency hops as described herein, or the processor 1340 and the memory 1330 may be otherwise configured to perform or support such operations.

Figure 14:
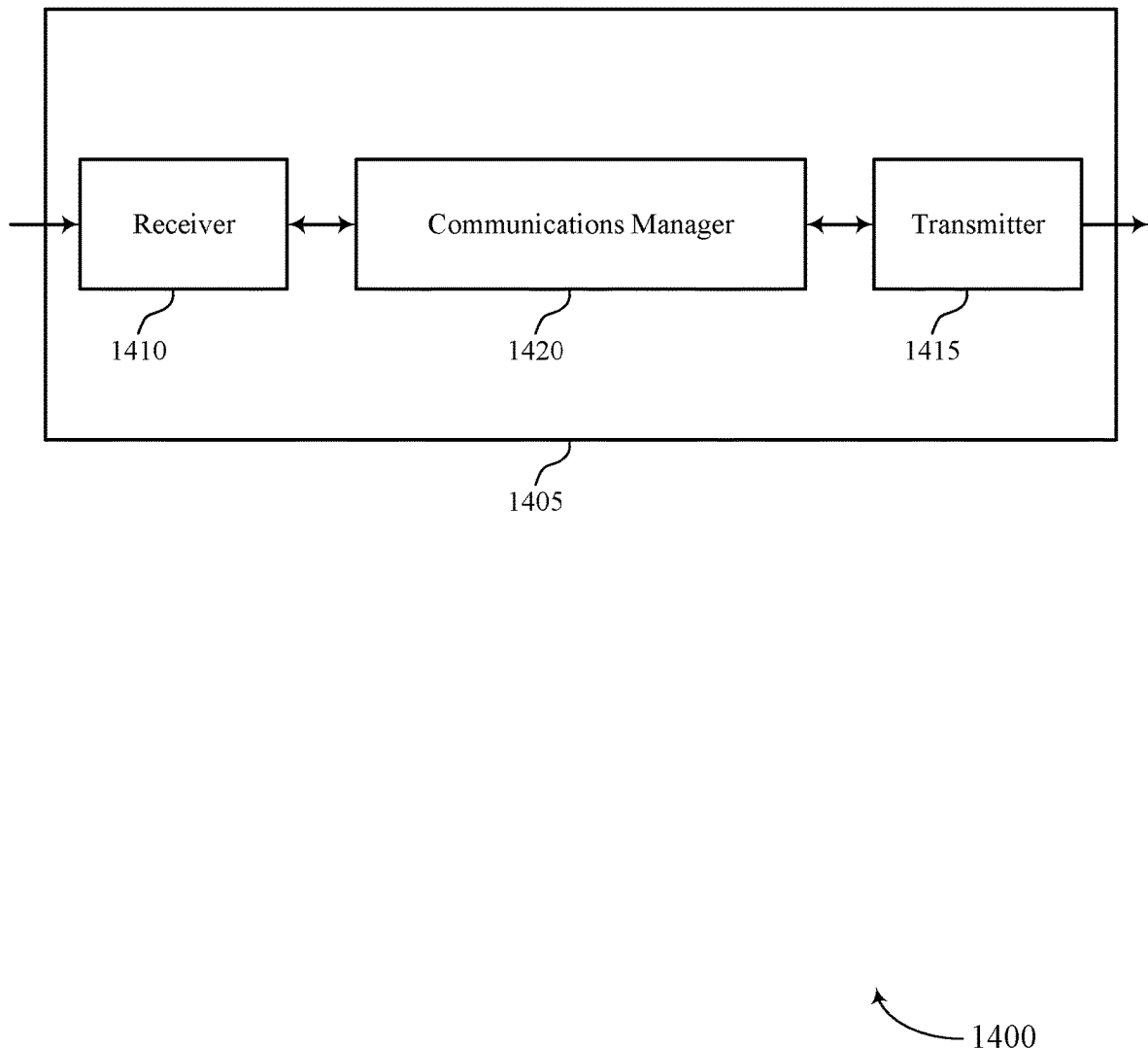
FIGS. 14 and 15 show block diagrams of devices that support techniques for time alignment of measurement gaps and frequency hops in accordance with aspects of the present disclosure.

FIG. 14 shows a block diagram 1400 of a device 1405 that supports techniques for time alignment of measurement gaps and frequency hops in accordance with aspects of the present disclosure. The device 1405 may be an example of aspects of a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for time alignment of measurement gaps and frequency hops). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for time alignment of measurement gaps and frequency hops). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of techniques for time alignment of measurement gaps and frequency hops as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a first base station in accordance with examples as disclosed herein. For example, the communications manager 1420 may be configured as or otherwise support a means for identifying a bandwidth part hopping pattern for a UE for communication with the first base station, and a set of switching timings for switching between different frequencies of a set of frequencies within a carrier bandwidth for the communications with the first base station. The communications manager 1420 may be configured as or otherwise support a means for identifying a measurement gap pattern for UE measurement of one or more reference signals from one or more neighboring base stations, the measurement gap pattern indicates a measurement gap length and a periodicity of repetitions of measurement gaps. The communications manager 1420 may be configured as or otherwise support a means for adjusting at least one of the set of switching timings to align with a reference point associated with the measurement gap pattern. The communications manager 1420 may be configured as or otherwise support a means for communicating with the UE using the bandwidth part hopping pattern according to the adjusted switching timings.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for alignment of one or more boundaries of a frequency hopping pattern with a reference point of a measurement gap pattern. Such techniques may reduce power consumption at a UE by providing fewer retuning gaps for RF components, may enhance data rates by providing fewer switching gaps, or any combinations thereof. As such, supported techniques may include improved network operations, and, in some examples, may promote network efficiencies and power reduction, among other benefits.

Figure 15:
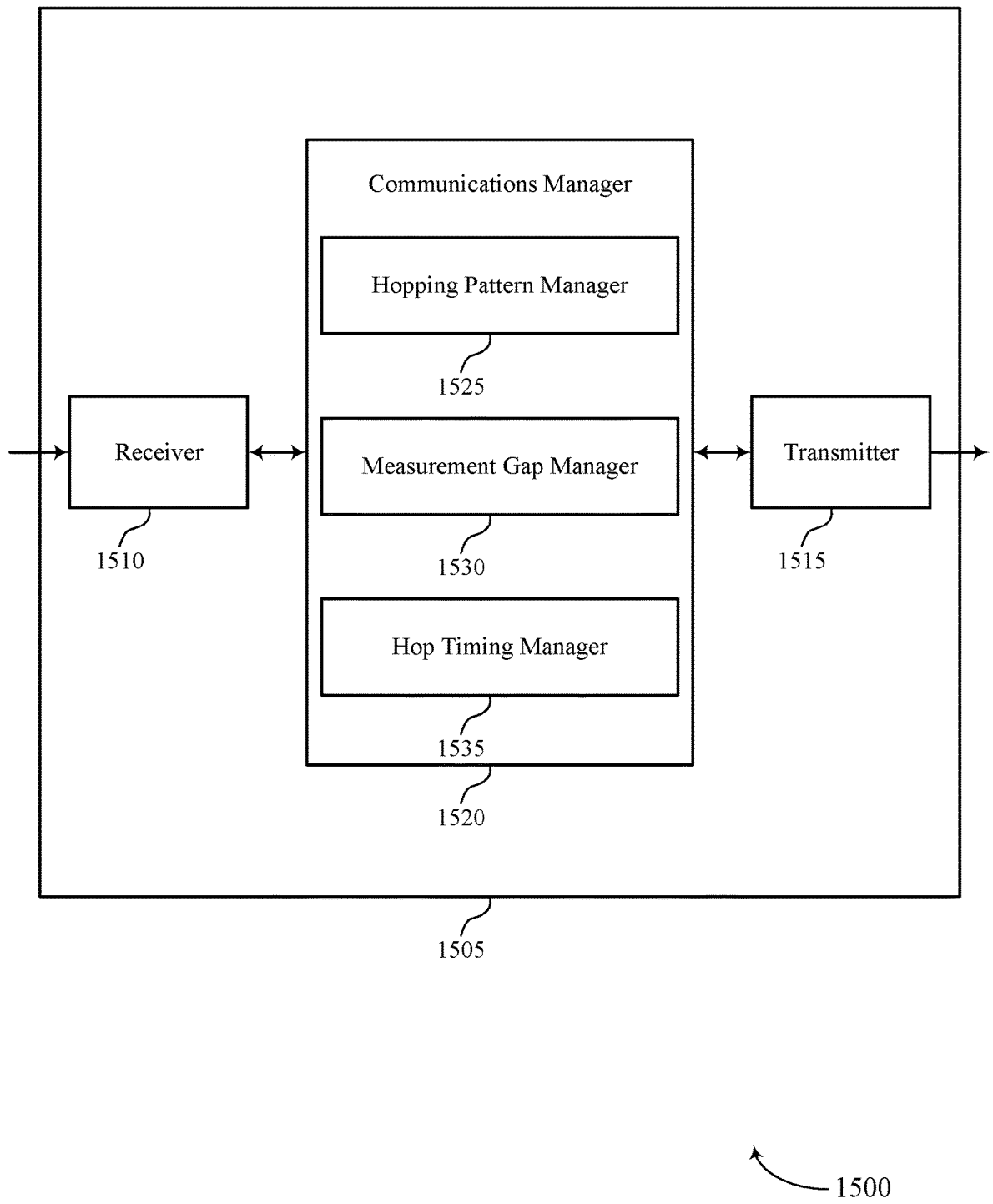

FIG. 15 shows a block diagram 1500 of a device 1505 that supports techniques for time alignment of measurement gaps and frequency hops in accordance with aspects of the present disclosure. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for time alignment of measurement gaps and frequency hops). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for time alignment of measurement gaps and frequency hops). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of techniques for time alignment of measurement gaps and frequency hops as described herein. For example, the communications manager 1520 may include a hopping pattern manager 1525, a measurement gap manager 1530, a hop timing manager 1535, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a first base station in accordance with examples as disclosed herein. The hopping pattern manager 1525 may be configured as or otherwise support a means for identifying a bandwidth part hopping pattern for a UE for communication with the first base station, and a set of switching timings for switching between different frequencies of a set of frequencies within a carrier bandwidth for the communications with the first base station. The measurement gap manager 1530 may be configured as or otherwise support a means for identifying a measurement gap pattern for UE measurement of one or more reference signals from one or more neighboring base stations, the measurement gap pattern indicates a measurement gap length and a periodicity of repetitions of measurement gaps. The hop timing manager 1535 may be configured as or otherwise support a means for adjusting at least one of the set of switching timings to align with a reference point associated with the measurement gap pattern. The hopping pattern manager 1525 may be configured as or otherwise support a means for communicating with the UE using the bandwidth part hopping pattern according to the adjusted switching timings.

Figure 16:
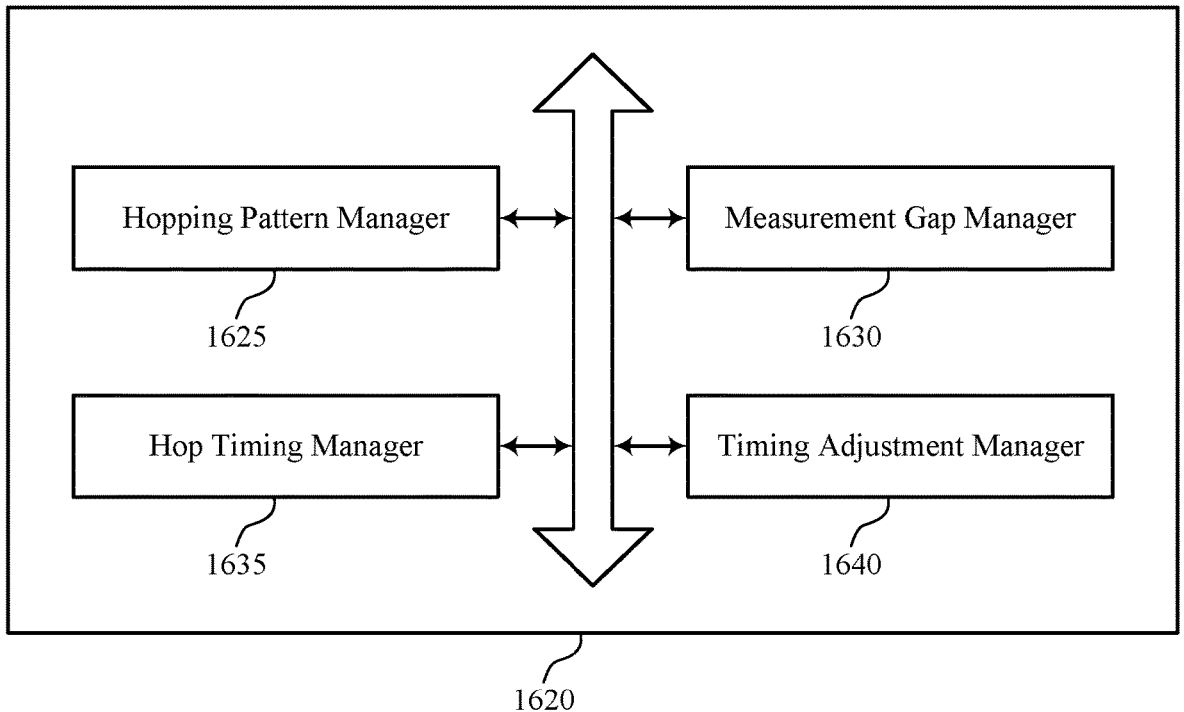
FIG. 16 shows a block diagram of a communications manager that supports techniques for time alignment of measurement gaps and frequency hops in accordance with aspects of the present disclosure.

FIG. 16 shows a block diagram 1600 of a communications manager 1620 that supports techniques for time alignment of measurement gaps and frequency hops in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of techniques for time alignment of measurement gaps and frequency hops as described herein. For example, the communications manager 1620 may include a hopping pattern manager 1625, a measurement gap manager 1630, a hop timing manager 1635, a timing adjustment manager 1640, or any combination thereof. Each of these components may communicate, directly or indirectly, with one another (e.g., via one or more buses).

The communications manager 1620 may support wireless communication at a first base station in accordance with examples as disclosed herein. The hopping pattern manager 1625 may be configured as or otherwise support a means for identifying a bandwidth part hopping pattern for a UE for communication with the first base station, and a set of switching timings for switching between different frequencies of a set of frequencies within a carrier bandwidth for the communications with the first base station. The measurement gap manager 1630 may be configured as or otherwise support a means for identifying a measurement gap pattern for UE measurement of one or more reference signals from one or more neighboring base stations, the measurement gap pattern indicates a measurement gap length and a periodicity of repetitions of measurement gaps. The hop timing manager 1635 may be configured as or otherwise support a means for adjusting at least one of the set of switching timings to align with a reference point associated with the measurement gap pattern. In some examples, the hopping pattern manager 1625 may be configured as or otherwise support a means for communicating with the UE using the bandwidth part hopping pattern according to the adjusted switching timings.

In some examples, the hopping pattern manager 1625 may be configured as or otherwise support a means for transmitting, to the UE, information that indicates the bandwidth part hopping pattern and the measurement gap pattern, and where the reference point corresponds to an end time of a first measurement gap and a start time of a first frequency hop of the bandwidth part hopping pattern is aligned with the reference point, or the reference point corresponds to a start time of the first measurement gap and an end time of the first frequency hop that is aligned with the reference point.

In some examples, the bandwidth part hopping pattern and the measurement gap pattern share a common switching gap for switching between different frequencies at the UE. In some examples, the reference point corresponds to a start time of a first measurement gap, and where the bandwidth part hopping pattern and the measurement gap pattern are selected to provide alignment of the reference point and an end time of a first frequency hop of the bandwidth part hopping pattern. In some examples, the reference point corresponds to an end time of a first measurement gap, and where the bandwidth part hopping pattern and the measurement gap pattern are selected to provide alignment of the reference point and a start time of a first frequency hop of the bandwidth part hopping pattern.

In some examples, to support adjusting, the timing adjustment manager 1640 may be configured as or otherwise support a means for adjusting a duration of a first hop of the bandwidth part hopping pattern that overlaps with, or is adjacent to, a first measurement gap of the measurement gap pattern, to provide alignment of the reference point with a start or end time of a first frequency hop of the bandwidth part hopping pattern. In some examples, the first hop precedes the first measurement gap, and an ending time of the first hop is extended to provide an ending time boundary that is aligned with the reference point. In some examples, the first hop overlaps the first measurement gap, and an ending time of the first hop is extended to provide an ending time boundary that corresponds to a subsequent hop to the first hop, and where a frequency switch associated with the subsequent hop is skipped. In some examples, the first hop follows the first measurement gap, and a starting time of the first hop is advanced to provide a starting time boundary that is aligned with the reference point.

In some examples, to support adjusting, the timing adjustment manager 1640 may be configured as or otherwise support a means for determining whether to extend or shorten the duration of a subsequent hop to the first hop based on a non-overlapping duration of the first hop and the first measurement gap, a frequency separation from a prior hop of the bandwidth part hopping pattern that is prior to the first measurement gap, the duration of the first hop relative to a measurement gap duration, or any combinations thereof.

In some examples, to support adjusting, the timing adjustment manager 1640 may be configured as or otherwise support a means for adjusting a duration of a first hop of the bandwidth part hopping pattern to align an ending time of the first hop with the reference point. In some examples, to support adjusting, the timing adjustment manager 1640 may be configured as or otherwise support a means for shifting subsequent hops to the first hop of the bandwidth part hopping pattern by an amount of the adjusted duration of the first hop, and where respective durations of the subsequent hops are unchanged.

Figure 17:
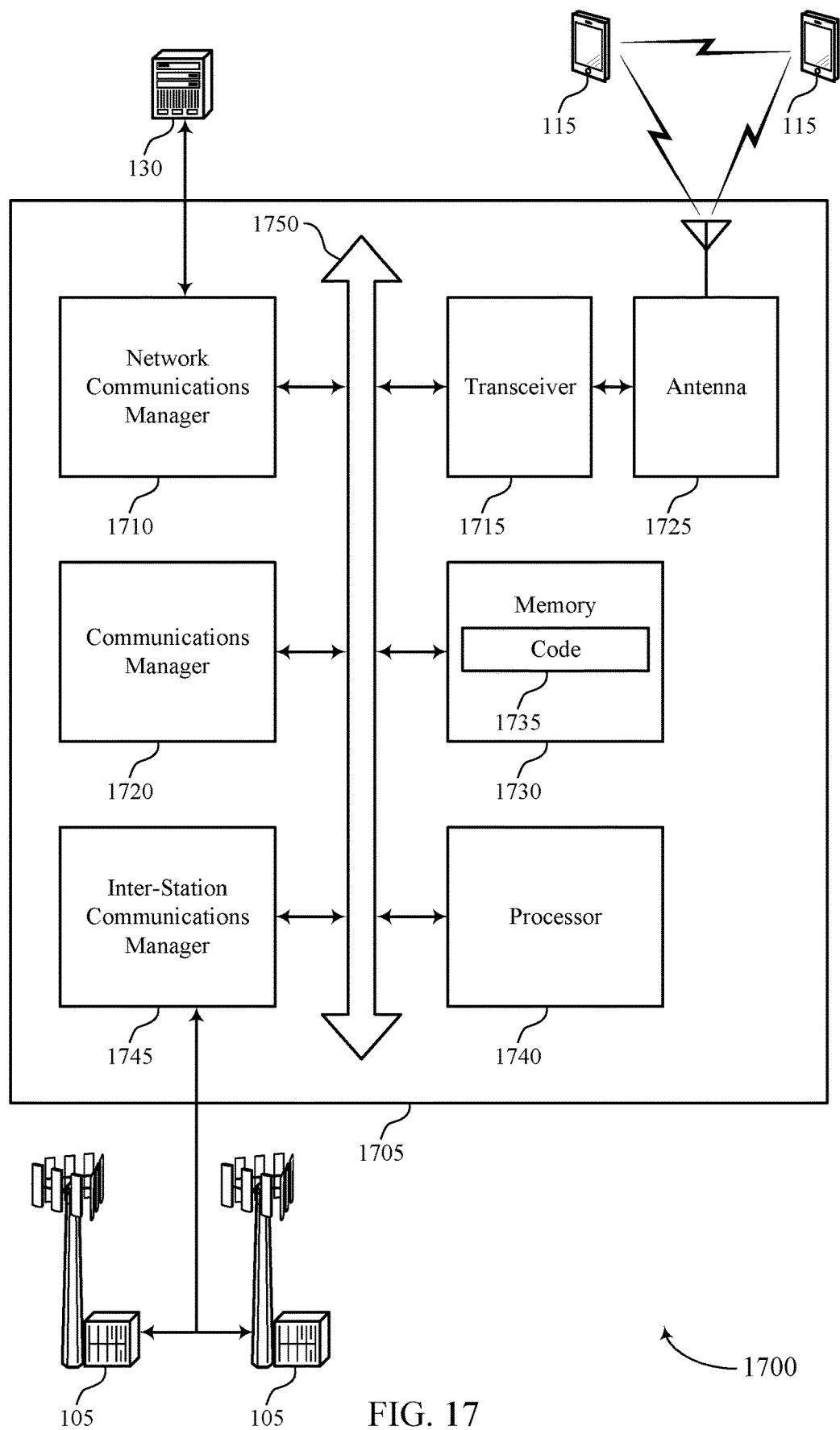
FIG. 17 shows a diagram of a system including a device that supports techniques for time alignment of measurement gaps and frequency hops in accordance with aspects of the present disclosure.

FIG. 17 shows a diagram of a system 1700 including a device 1705 that supports techniques for time alignment of measurement gaps and frequency hops in accordance with aspects of the present disclosure. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting techniques for time alignment of measurement gaps and frequency hops). For example, the device 1705 or a component of the device 1705 may include a processor 1740 and memory 1730 coupled to the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communication at a first base station in accordance with examples as disclosed herein. For example, the communications manager 1720 may be configured as or otherwise support a means for identifying a bandwidth part hopping pattern for a UE for communication with the first base station, and a set of switching timings for switching between different frequencies of a set of frequencies within a carrier bandwidth for the communications with the first base station. The communications manager 1720 may be configured as or otherwise support a means for identifying a measurement gap pattern for UE measurement of one or more reference signals from one or more neighboring base stations, the measurement gap pattern indicates a measurement gap length and a periodicity of repetitions of measurement gaps. The communications manager 1720 may be configured as or otherwise support a means for adjusting at least one of the set of switching timings to align with a reference point associated with the measurement gap pattern. The communications manager 1720 may be configured as or otherwise support a means for communicating with the UE using the bandwidth part hopping pattern according to the adjusted switching timings.

By including or configuring the communications manager 1720 in accordance with examples as described herein, the device 1705 may support techniques for alignment of one or more boundaries of a frequency hopping pattern with a reference point of a measurement gap pattern. Such techniques may reduce power consumption at a UE by providing fewer retuning gaps for RF components, may enhance data rates by providing fewer switching gaps, or any combinations thereof. As such, supported techniques may include improved network operations, and, in some examples, may promote network efficiencies and power reduction, among other benefits.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of techniques for time alignment of measurement gaps and frequency hops as described herein, or the processor 1740 and the memory 1730 may be otherwise configured to perform or support such operations.

Figure 18:
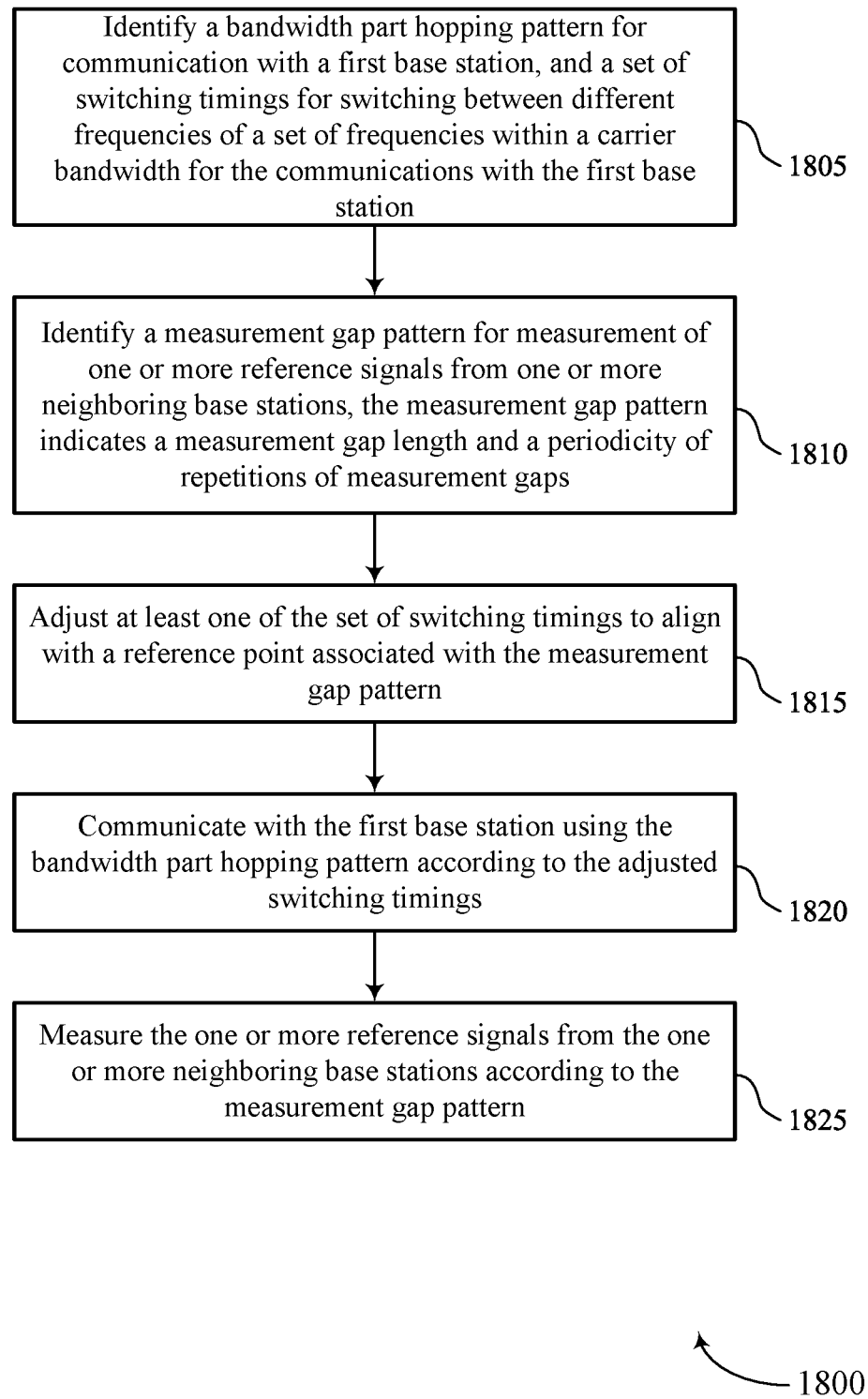
FIGS. 18 through 25 show flowcharts illustrating methods that support techniques for time alignment of measurement gaps and frequency hops in accordance with aspects of the present disclosure.

FIG. 18 shows a flowchart illustrating a method 1800 that supports techniques for time alignment of measurement gaps and frequency hops in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include identifying a bandwidth part hopping pattern for communication with a first base station, and a set of switching timings for switching between different frequencies of a set of frequencies within a carrier bandwidth for the communications with the first base station. The operations of 1805 may be performed in accordance with examples as disclosed herein. In some examples, aspects of the operations of 1805 may be performed by a hopping pattern manager 1225 as described with reference to FIG. 12.

At 1810, the method may include identifying a measurement gap pattern for measurement of one or more reference signals from one or more neighboring base stations, the measurement gap pattern indicates a measurement gap length and a periodicity of repetitions of measurement gaps. The operations of 1810 may be performed in accordance with examples as disclosed herein. In some examples, aspects of the operations of 1810 may be performed by a measurement gap manager 1230 as described with reference to FIG. 12.

At 1815, the method may include adjusting at least one of the set of switching timings to align with a reference point associated with the measurement gap pattern. The operations of 1815 may be performed in accordance with examples as disclosed herein. In some examples, aspects of the operations of 1815 may be performed by a hop timing manager 1235 as described with reference to FIG. 12.

At 1820, the method may include communicating with the first base station using the bandwidth part hopping pattern according to the adjusted switching timings. The operations of 1820 may be performed in accordance with examples as disclosed herein. In some examples, aspects of the operations of 1820 may be performed by a hopping pattern manager 1225 as described with reference to FIG. 12.

At 1825, the method may include measuring the one or more reference signals from the one or more neighboring base stations according to the measurement gap pattern. The operations of 1825 may be performed in accordance with examples as disclosed herein. In some examples, aspects of the operations of 1825 may be performed by a measurement manager 1240 as described with reference to FIG. 12.

Figure 19:
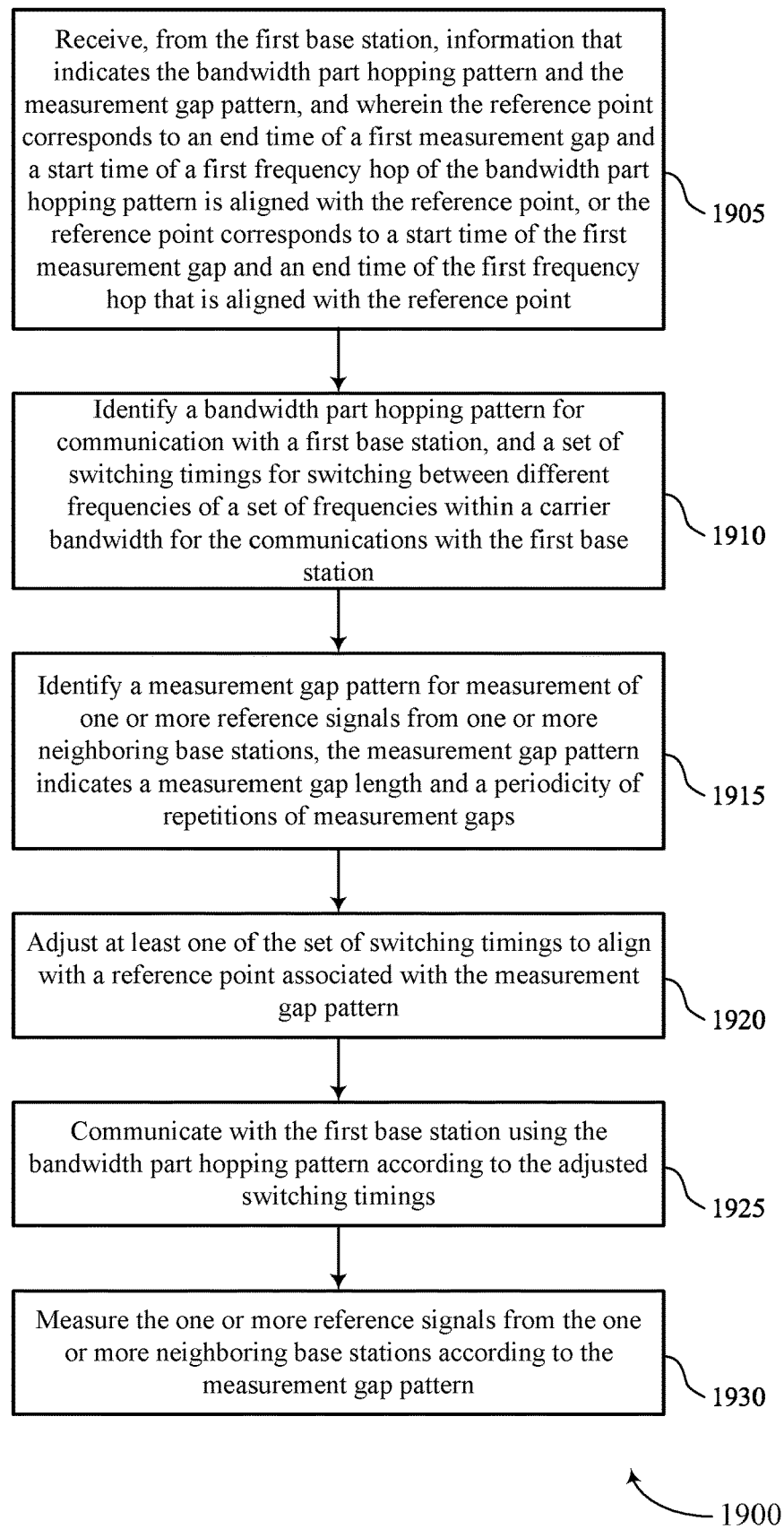

FIG. 19 shows a flowchart illustrating a method 1900 that supports techniques for time alignment of measurement gaps and frequency hops in accordance with aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include receiving, from the first base station, information that indicates the bandwidth part hopping pattern and the measurement gap pattern, and where the reference point corresponds to an end time of a first measurement gap and a start time of a first frequency hop of the bandwidth part hopping pattern is aligned with the reference point, or the reference point corresponds to a start time of the first measurement gap and an end time of the first frequency hop that is aligned with the reference point. The operations of 1905 may be performed in accordance with examples as disclosed herein. In some examples, aspects of the operations of 1905 may be performed by a hopping pattern manager 1225 as described with reference to FIG. 12.

At 1910, the method may include identifying a bandwidth part hopping pattern for communication with a first base station, and a set of switching timings for switching between different frequencies of a set of frequencies within a carrier bandwidth for the communications with the first base station. The operations of 1910 may be performed in accordance with examples as disclosed herein. In some examples, aspects of the operations of 1910 may be performed by a hopping pattern manager 1225 as described with reference to FIG. 12.

At 1915, the method may include identifying a measurement gap pattern for measurement of one or more reference signals from one or more neighboring base stations, the measurement gap pattern indicates a measurement gap length and a periodicity of repetitions of measurement gaps. The operations of 1915 may be performed in accordance with examples as disclosed herein. In some examples, aspects of the operations of 1915 may be performed by a measurement gap manager 1230 as described with reference to FIG. 12.

At 1920, the method may include adjusting at least one of the set of switching timings to align with a reference point associated with the measurement gap pattern. The operations of 1920 may be performed in accordance with examples as disclosed herein. In some examples, aspects of the operations of 1920 may be performed by a hop timing manager 1235 as described with reference to FIG. 12.

At 1925, the method may include communicating with the first base station using the bandwidth part hopping pattern according to the adjusted switching timings. The operations of 1925 may be performed in accordance with examples as disclosed herein. In some examples, aspects of the operations of 1925 may be performed by a hopping pattern manager 1225 as described with reference to FIG. 12.

At 1930, the method may include measuring the one or more reference signals from the one or more neighboring base stations according to the measurement gap pattern. The operations of 1930 may be performed in accordance with examples as disclosed herein. In some examples, aspects of the operations of 1930 may be performed by a measurement manager 1240 as described with reference to FIG. 12.

Figure 20:
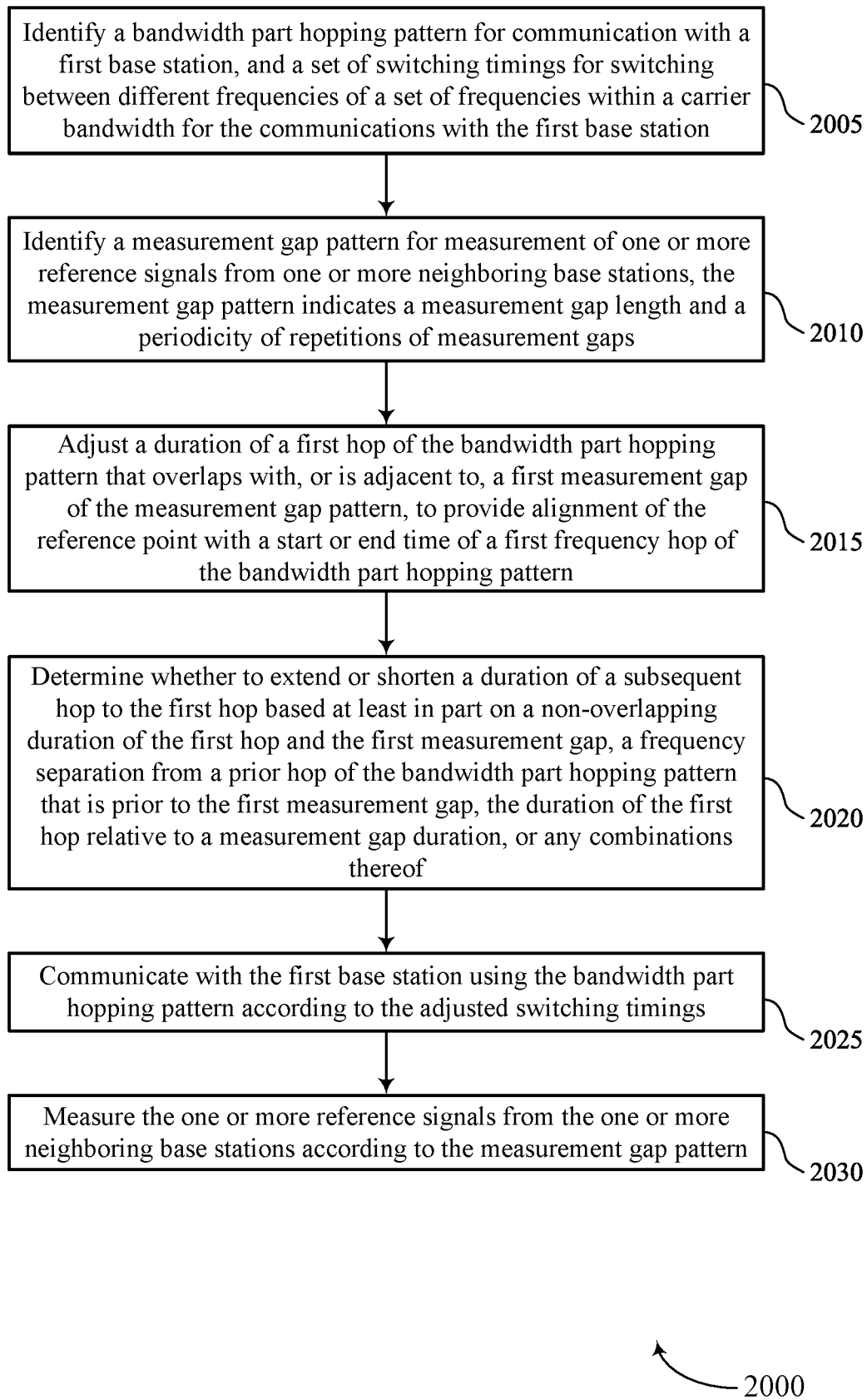

FIG. 20 shows a flowchart illustrating a method 2000 that supports techniques for time alignment of measurement gaps and frequency hops in accordance with aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2005, the method may include identifying a bandwidth part hopping pattern for communication with a first base station, and a set of switching timings for switching between different frequencies of a set of frequencies within a carrier bandwidth for the communications with the first base station. The operations of 2005 may be performed in accordance with examples as disclosed herein. In some examples, aspects of the operations of 2005 may be performed by a hopping pattern manager 1225 as described with reference to FIG. 12.

At 2010, the method may include identifying a measurement gap pattern for measurement of one or more reference signals from one or more neighboring base stations, the measurement gap pattern indicates a measurement gap length and a periodicity of repetitions of measurement gaps. The operations of 2010 may be performed in accordance with examples as disclosed herein. In some examples, aspects of the operations of 2010 may be performed by a measurement gap manager 1230 as described with reference to FIG. 12.

At 2015, the method may include adjusting a duration of a first hop of the bandwidth part hopping pattern that overlaps with, or is adjacent to, a first measurement gap of the measurement gap pattern, to provide alignment of the reference point with a start or end time of a first frequency hop of the bandwidth part hopping pattern. The operations of 2015 may be performed in accordance with examples as disclosed herein. In some examples, aspects of the operations of 2015 may be performed by a timing adjustment manager 1245 as described with reference to FIG. 12.

At 2020, the method may include determining whether to extend or shorten a duration of a subsequent hop to the first hop based on a non-overlapping duration of the first hop and the first measurement gap, a frequency separation from a prior hop of the bandwidth part hopping pattern that is prior to the first measurement gap, the duration of the first hop relative to a measurement gap duration, or any combinations thereof. The operations of 2020 may be performed in accordance with examples as disclosed herein. In some examples, aspects of the operations of 2020 may be performed by a timing adjustment manager 1245 as described with reference to FIG. 12.

At 2025, the method may include communicating with the first base station using the bandwidth part hopping pattern according to the adjusted switching timings. The operations of 2025 may be performed in accordance with examples as disclosed herein. In some examples, aspects of the operations of 2025 may be performed by a hopping pattern manager 1225 as described with reference to FIG. 12.

At 2030, the method may include measuring the one or more reference signals from the one or more neighboring base stations according to the measurement gap pattern. The operations of 2030 may be performed in accordance with examples as disclosed herein. In some examples, aspects of the operations of 2030 may be performed by a measurement manager 1240 as described with reference to FIG. 12.

Figure 21:
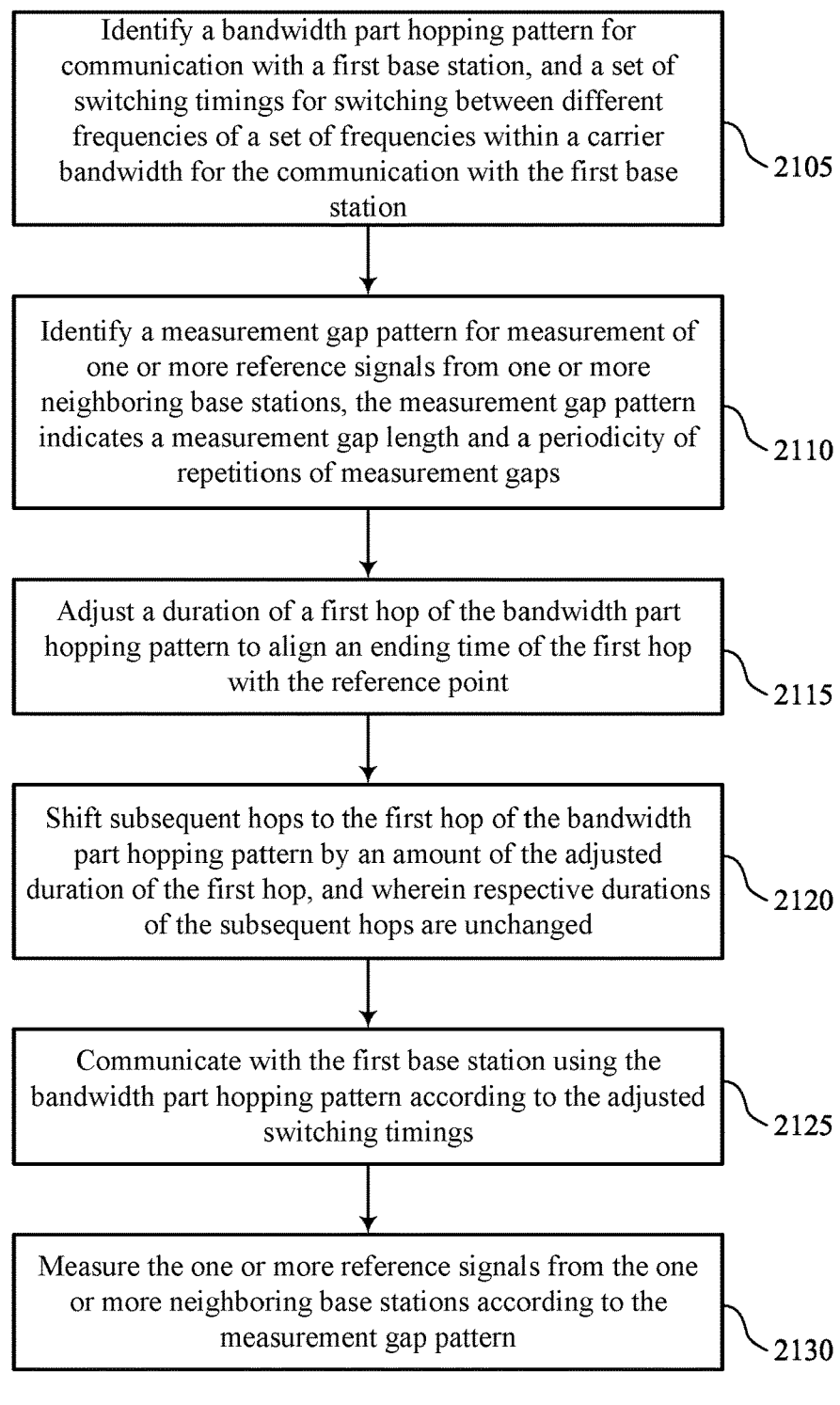

FIG. 21 shows a flowchart illustrating a method 2100 that supports techniques for time alignment of measurement gaps and frequency hops in accordance with aspects of the present disclosure. The operations of the method 2100 may be implemented by a UE or its components as described herein. For example, the operations of the method 2100 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2105, the method may include identifying a bandwidth part hopping pattern for communication with a first base station, and a set of switching timings for switching between different frequencies of a set of frequencies within a carrier bandwidth for the communications with the first base station. The operations of 2105 may be performed in accordance with examples as disclosed herein. In some examples, aspects of the operations of 2105 may be performed by a hopping pattern manager 1225 as described with reference to FIG. 12.

At 2110, the method may include identifying a measurement gap pattern for measurement of one or more reference signals from one or more neighboring base stations, the measurement gap pattern indicates a measurement gap length and a periodicity of repetitions of measurement gaps. The operations of 2110 may be performed in accordance with examples as disclosed herein. In some examples, aspects of the operations of 2110 may be performed by a measurement gap manager 1230 as described with reference to FIG. 12.

At 2115, the method may include adjusting a duration of a first hop of the bandwidth part hopping pattern to align an ending time of the first hop with the reference point. The operations of 2115 may be performed in accordance with examples as disclosed herein. In some examples, aspects of the operations of 2115 may be performed by a timing adjustment manager 1245 as described with reference to FIG. 12.

At 2120, the method may include shifting subsequent hops to the first hop of the bandwidth part hopping pattern by an amount of the adjusted duration of the first hop, and where respective durations of the subsequent hops are unchanged. The operations of 2120 may be performed in accordance with examples as disclosed herein. In some examples, aspects of the operations of 2120 may be performed by a timing adjustment manager 1245 as described with reference to FIG. 12.

At 2125, the method may include communicating with the first base station using the bandwidth part hopping pattern according to the adjusted switching timings. The operations of 2125 may be performed in accordance with examples as disclosed herein. In some examples, aspects of the operations of 2125 may be performed by a hopping pattern manager 1225 as described with reference to FIG. 12.

At 2130, the method may include measuring the one or more reference signals from the one or more neighboring base stations according to the measurement gap pattern. The operations of 2130 may be performed in accordance with examples as disclosed herein. In some examples, aspects of the operations of 2130 may be performed by a measurement manager 1240 as described with reference to FIG. 12.

Figure 22:
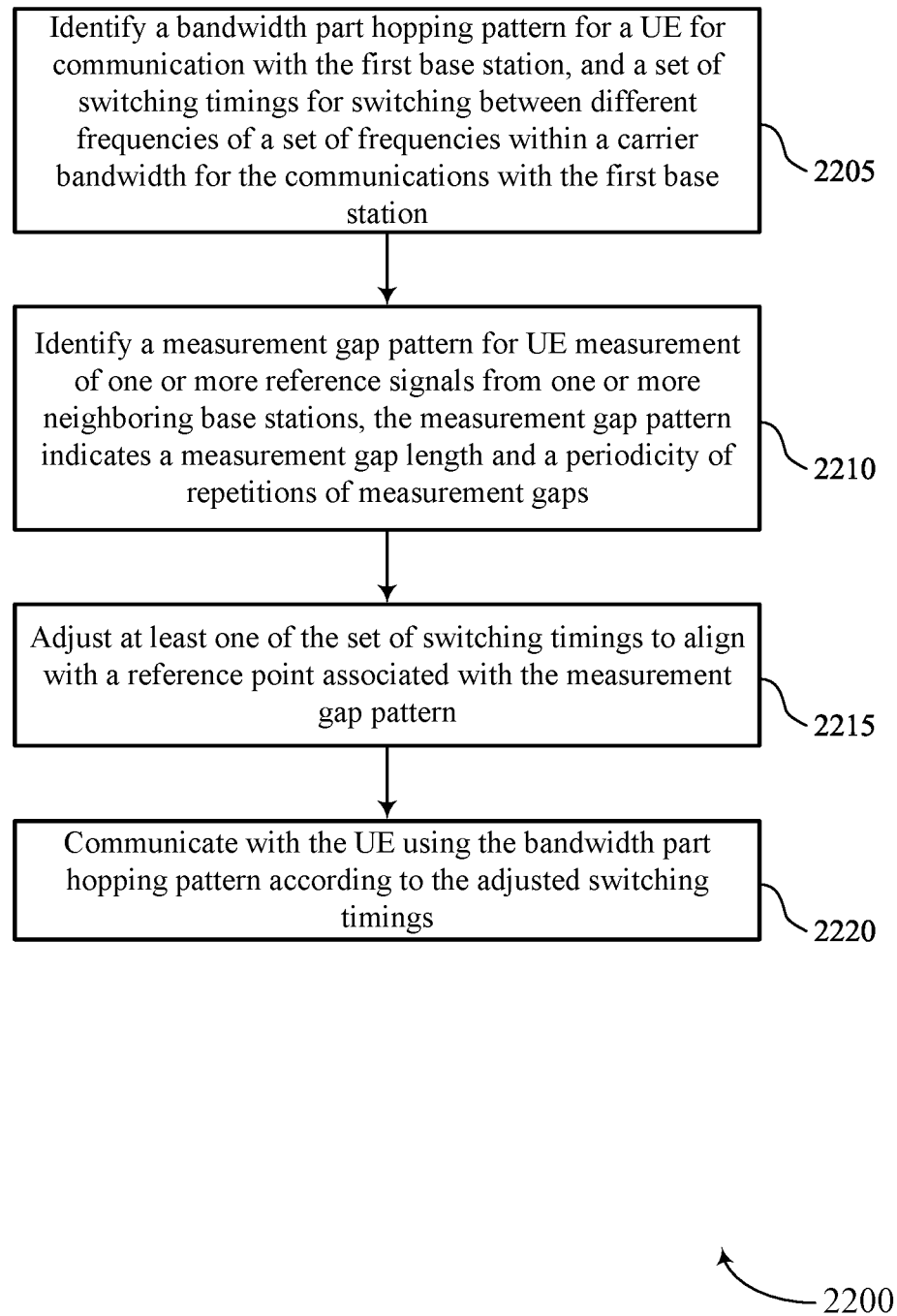

FIG. 22 shows a flowchart illustrating a method 2200 that supports techniques for time alignment of measurement gaps and frequency hops in accordance with aspects of the present disclosure. The operations of the method 2200 may be implemented by a base station or its components as described herein. For example, the operations of the method 2200 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2205, the method may include identifying a bandwidth part hopping pattern for a UE for communication with the first base station, and a set of switching timings for switching between different frequencies of a set of frequencies within a carrier bandwidth for the communications with the first base station. The operations of 2205 may be performed in accordance with examples as disclosed herein. In some examples, aspects of the operations of 2205 may be performed by a hopping pattern manager 1625 as described with reference to FIG. 16.

At 2210, the method may include identifying a measurement gap pattern for UE measurement of one or more reference signals from one or more neighboring base stations, the measurement gap pattern indicates a measurement gap length and a periodicity of repetitions of measurement gaps. The operations of 2210 may be performed in accordance with examples as disclosed herein. In some examples, aspects of the operations of 2210 may be performed by a measurement gap manager 1630 as described with reference to FIG. 16.

At 2215, the method may include adjusting at least one of the set of switching timings to align with a reference point associated with the measurement gap pattern. The operations of 2215 may be performed in accordance with examples as disclosed herein. In some examples, aspects of the operations of 2215 may be performed by a hop timing manager 1635 as described with reference to FIG. 16.

At 2220, the method may include communicating with the UE using the bandwidth part hopping pattern according to the adjusted switching timings. The operations of 2220 may be performed in accordance with examples as disclosed herein. In some examples, aspects of the operations of 2220 may be performed by a hopping pattern manager 1625 as described with reference to FIG. 16.

Figure 23:
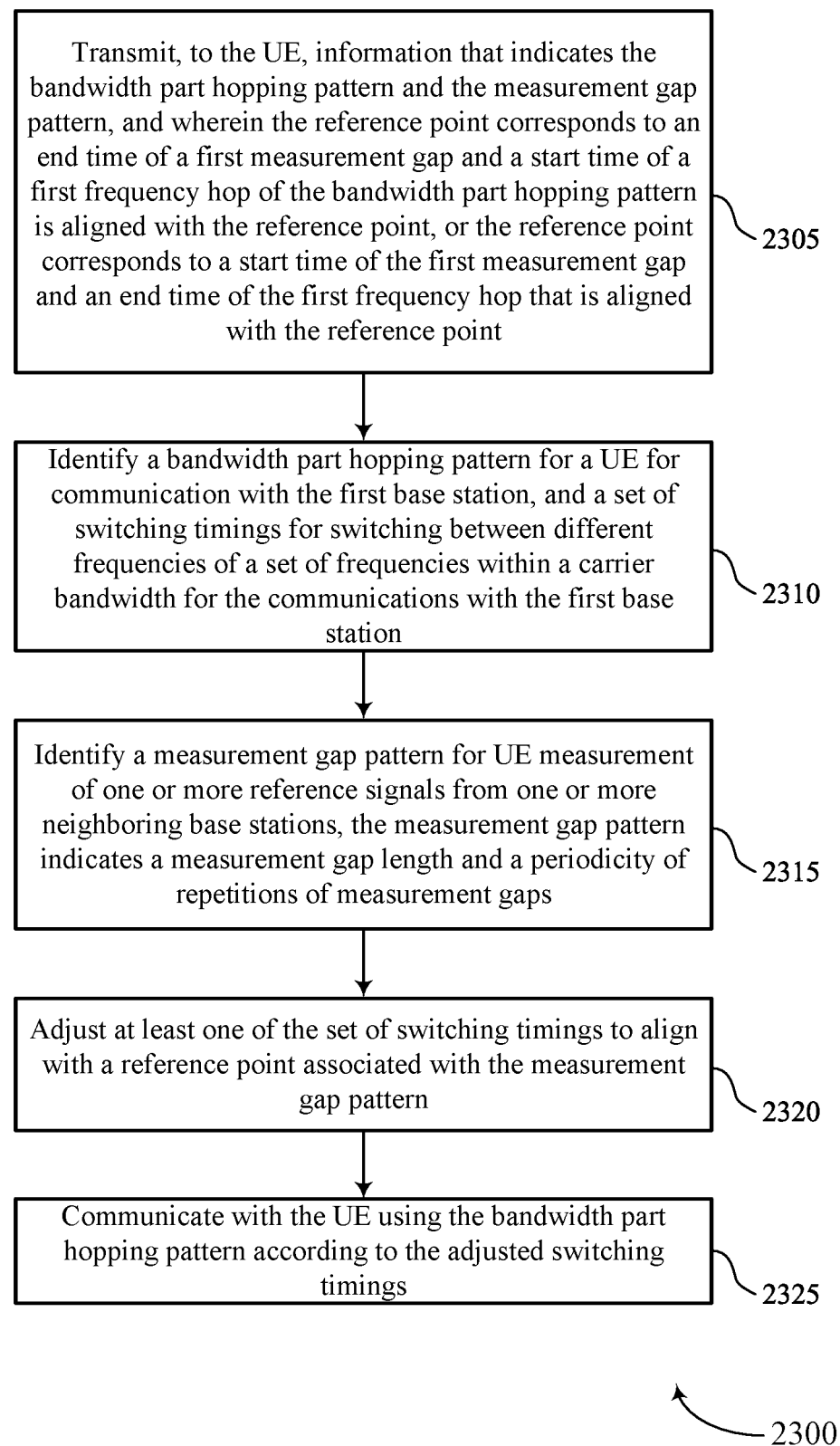

FIG. 23 shows a flowchart illustrating a method 2300 that supports techniques for time alignment of measurement gaps and frequency hops in accordance with aspects of the present disclosure. The operations of the method 2300 may be implemented by a base station or its components as described herein. For example, the operations of the method 2300 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2305, the method may include transmitting, to the UE, information that indicates the bandwidth part hopping pattern and the measurement gap pattern, and where the reference point corresponds to an end time of a first measurement gap and a start time of a first frequency hop of the bandwidth part hopping pattern is aligned with the reference point, or the reference point corresponds to a start time of the first measurement gap and an end time of the first frequency hop that is aligned with the reference point. The operations of 2305 may be performed in accordance with examples as disclosed herein. In some examples, aspects of the operations of 2305 may be performed by a hopping pattern manager 1625 as described with reference to FIG. 16.

At 2310, the method may include identifying a bandwidth part hopping pattern for a UE for communication with the first base station, and a set of switching timings for switching between different frequencies of a set of frequencies within a carrier bandwidth for the communications with the first base station. The operations of 2310 may be performed in accordance with examples as disclosed herein. In some examples, aspects of the operations of 2310 may be performed by a hopping pattern manager 1625 as described with reference to FIG. 16.

At 2315, the method may include identifying a measurement gap pattern for UE measurement of one or more reference signals from one or more neighboring base stations, the measurement gap pattern indicates a measurement gap length and a periodicity of repetitions of measurement gaps. The operations of 2315 may be performed in accordance with examples as disclosed herein. In some examples, aspects of the operations of 2315 may be performed by a measurement gap manager 1630 as described with reference to FIG. 16.

At 2320, the method may include adjusting at least one of the set of switching timings to align with a reference point associated with the measurement gap pattern. The operations of 2320 may be performed in accordance with examples as disclosed herein. In some examples, aspects of the operations of 2320 may be performed by a hop timing manager 1635 as described with reference to FIG. 16.

At 2325, the method may include communicating with the UE using the bandwidth part hopping pattern according to the adjusted switching timings. The operations of 2325 may be performed in accordance with examples as disclosed herein. In some examples, aspects of the operations of 2325 may be performed by a hopping pattern manager 1625 as described with reference to FIG. 16.

Figure 24:
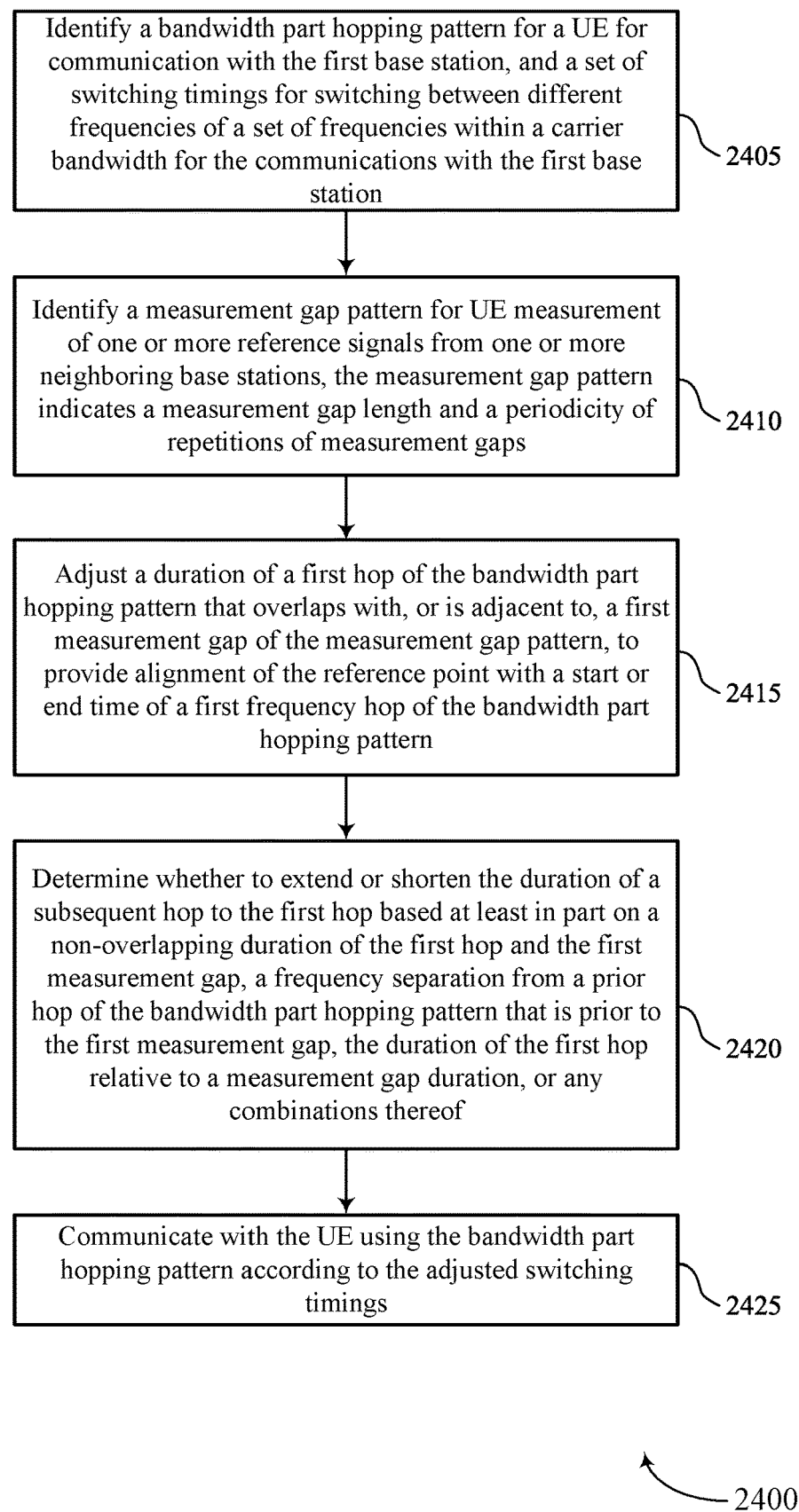

FIG. 24 shows a flowchart illustrating a method 2400 that supports techniques for time alignment of measurement gaps and frequency hops in accordance with aspects of the present disclosure. The operations of the method 2400 may be implemented by a base station or its components as described herein. For example, the operations of the method 2400 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2405, the method may include identifying a bandwidth part hopping pattern for a UE for communication with the first base station, and a set of switching timings for switching between different frequencies of a set of frequencies within a carrier bandwidth for the communications with the first base station. The operations of 2405 may be performed in accordance with examples as disclosed herein. In some examples, aspects of the operations of 2405 may be performed by a hopping pattern manager 1625 as described with reference to FIG. 16.

At 2410, the method may include identifying a measurement gap pattern for UE measurement of one or more reference signals from one or more neighboring base stations, the measurement gap pattern indicates a measurement gap length and a periodicity of repetitions of measurement gaps. The operations of 2410 may be performed in accordance with examples as disclosed herein. In some examples, aspects of the operations of 2410 may be performed by a measurement gap manager 1630 as described with reference to FIG. 16.

At 2415, the method may include adjusting a duration of a first hop of the bandwidth part hopping pattern that overlaps with, or is adjacent to, a first measurement gap of the measurement gap pattern, to provide alignment of the reference point with a start or end time of a first frequency hop of the bandwidth part hopping pattern. The operations of 2415 may be performed in accordance with examples as disclosed herein. In some examples, aspects of the operations of 2415 may be performed by a timing adjustment manager 1640 as described with reference to FIG. 16.

At 2420, the method may include determining whether to extend or shorten the duration of a subsequent hop to the first hop based on a non-overlapping duration of the first hop and the first measurement gap, a frequency separation from a prior hop of the bandwidth part hopping pattern that is prior to the first measurement gap, the duration of the first hop relative to a measurement gap duration, or any combinations thereof. The operations of 2420 may be performed in accordance with examples as disclosed herein. In some examples, aspects of the operations of 2420 may be performed by a timing adjustment manager 1640 as described with reference to FIG. 16.

At 2425, the method may include communicating with the UE using the bandwidth part hopping pattern according to the adjusted switching timings. The operations of 2425 may be performed in accordance with examples as disclosed herein. In some examples, aspects of the operations of 2425 may be performed by a hopping pattern manager 1625 as described with reference to FIG. 16.

Figure 25:
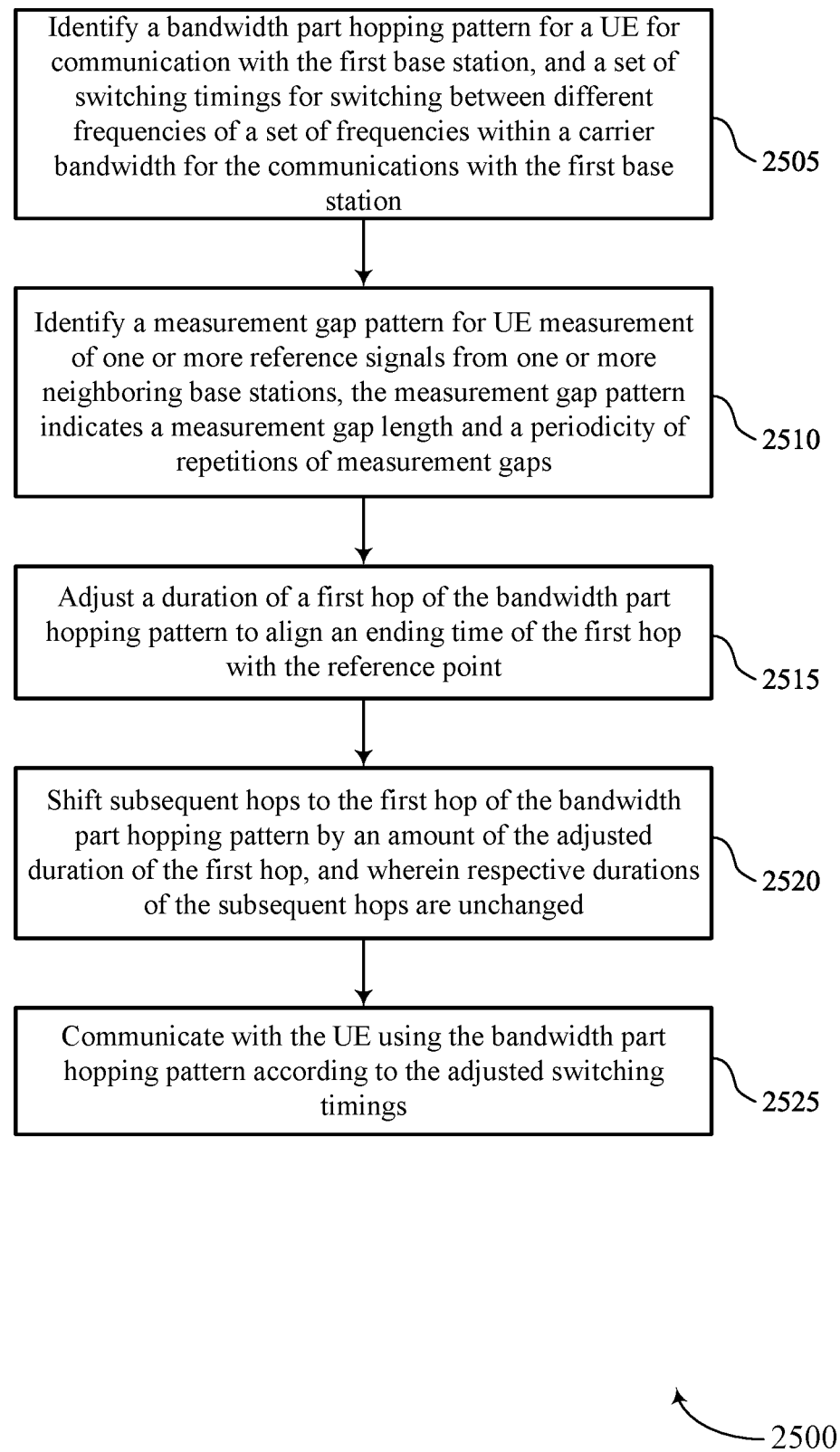

FIG. 25 shows a flowchart illustrating a method 2500 that supports techniques for time alignment of measurement gaps and frequency hops in accordance with aspects of the present disclosure. The operations of the method 2500 may be implemented by a base station or its components as described herein. For example, the operations of the method 2500 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2505, the method may include identifying a bandwidth part hopping pattern for a UE for communication with the first base station, and a set of switching timings for switching between different frequencies of a set of frequencies within a carrier bandwidth for the communications with the first base station. The operations of 2505 may be performed in accordance with examples as disclosed herein. In some examples, aspects of the operations of 2505 may be performed by a hopping pattern manager 1625 as described with reference to FIG. 16.

At 2510, the method may include identifying a measurement gap pattern for UE measurement of one or more reference signals from one or more neighboring base stations, the measurement gap pattern indicates a measurement gap length and a periodicity of repetitions of measurement gaps. The operations of 2510 may be performed in accordance with examples as disclosed herein. In some examples, aspects of the operations of 2510 may be performed by a measurement gap manager 1630 as described with reference to FIG. 16.

At 2515, the method may include adjusting a duration of a first hop of the bandwidth part hopping pattern to align an ending time of the first hop with the reference point. The operations of 2515 may be performed in accordance with examples as disclosed herein. In some examples, aspects of the operations of 2515 may be performed by a timing adjustment manager 1640 as described with reference to FIG. 16.

At 2520, the method may include shifting subsequent hops to the first hop of the bandwidth part hopping pattern by an amount of the adjusted duration of the first hop, and where respective durations of the subsequent hops are unchanged. The operations of 2520 may be performed in accordance with examples as disclosed herein. In some examples, aspects of the operations of 2520 may be performed by a timing adjustment manager 1640 as described with reference to FIG. 16.

At 2525, the method may include communicating with the UE using the bandwidth part hopping pattern according to the adjusted switching timings. The operations of 2525 may be performed in accordance with examples as disclosed herein. In some examples, aspects of the operations of 2525 may be performed by a hopping pattern manager 1625 as described with reference to FIG. 16.

The following provides an overview of aspects of the present disclosure:

Aspect 1: A method for wireless communication at a UE, comprising: identifying a bandwidth part hopping pattern for communication with a first base station, and a set of switching timings for switching between different frequencies of a set of frequencies within a carrier bandwidth for the communications with the first base station; identifying a measurement gap pattern for measurement of one or more reference signals from one or more neighboring base stations, the measurement gap pattern indicates a measurement gap length and a periodicity of repetitions of measurement gaps; adjusting at least one of the set of switching timings to align with a reference point associated with the measurement gap pattern; communicating with the first base station using the bandwidth part hopping pattern according to the adjusted switching timings; and measuring the one or more reference signals from the one or more neighboring base stations according to the measurement gap pattern.

Aspect 2: The method of aspect 1, further comprising: receiving, from the first base station, information that indicates the bandwidth part hopping pattern and the measurement gap pattern, and wherein the reference point corresponds to an end time of a first measurement gap and a start time of a first frequency hop of the bandwidth part hopping pattern is aligned with the reference point, or the reference point corresponds to a start time of the first measurement gap and an end time of the first frequency hop that is aligned with the reference point.

Aspect 3: The method of any of aspects 1 through 2, wherein the bandwidth part hopping pattern and the measurement gap pattern share a common switching gap for retuning to a different frequency at the UE.

Aspect 4: The method of aspect 1, wherein the reference point corresponds to a start time of a first measurement gap, and wherein the bandwidth part hopping pattern and the measurement gap pattern are selected to provide alignment of the reference point and an end time of a first frequency hop of the bandwidth part hopping pattern.

Aspect 5: The method of aspect 1, wherein the reference point corresponds to an end time of a first measurement gap, and wherein the bandwidth part hopping pattern and the measurement gap pattern are selected to provide alignment of the reference point and a start time of a first frequency hop of the bandwidth part hopping pattern.

Aspect 6: The method of aspect 1, wherein the adjusting comprises: adjusting a duration of a first hop of the bandwidth part hopping pattern that overlaps with, or is adjacent to, a first measurement gap of the measurement gap pattern, to provide alignment of the reference point with a start or end time of a first frequency hop of the bandwidth part hopping pattern.

Aspect 7: The method of aspect 6, wherein the first hop precedes the first measurement gap, and an ending time of the first hop is extended to provide an ending time boundary that is aligned with the reference point.

Aspect 8: The method of any of aspects 6 through 7, wherein the first hop overlaps the first measurement gap, and an ending time of the first hop is extended to provide an ending time boundary that corresponds to a subsequent hop to the first hop, and wherein a frequency switch associated with the subsequent hop is skipped.

Aspect 9: The method of aspect 6, wherein the first hop follows the first measurement gap, and a starting time of the first hop is advanced to provide a starting time boundary that is aligned with the reference point.

Aspect 10: The method of any of aspects 6 through 9, wherein the adjusting further comprises: determining whether to extend or shorten a duration of a subsequent hop to the first hop based at least in part on a non-overlapping duration of the first hop and the first measurement gap, a frequency separation from a prior hop of the bandwidth part hopping pattern that is prior to the first measurement gap, the duration of the first hop relative to a measurement gap duration, or any combinations thereof.

Aspect 11: The method of aspect 1, wherein the adjusting comprises: adjusting a duration of a first hop of the bandwidth part hopping pattern to align an ending time of the first hop with the reference point; and shifting subsequent hops to the first hop of the bandwidth part hopping pattern by an amount of the adjusted duration of the first hop, and wherein respective durations of the subsequent hops are unchanged.

Aspect 12: A method for wireless communication at a first base station, comprising: identifying a bandwidth part hopping pattern for a UE for communication with the first base station, and a set of switching timings for switching between different frequencies of a set of frequencies within a carrier bandwidth for the communications with the first base station; identifying a measurement gap pattern for UE measurement of one or more reference signals from one or more neighboring base stations, the measurement gap pattern indicates a measurement gap length and a periodicity of repetitions of measurement gaps adjusting at least one of the set of switching timings to align with a reference point associated with the measurement gap pattern; and communicating with the UE using the bandwidth part hopping pattern according to the adjusted switching timings.

Aspect 13: The method of aspect 12, further comprising: transmitting, to the UE, information that indicates the bandwidth part hopping pattern and the measurement gap pattern, and wherein the reference point corresponds to an end time of a first measurement gap and a start time of a first frequency hop of the bandwidth part hopping pattern is aligned with the reference point, or the reference point corresponds to a start time of the first measurement gap and an end time of the first frequency hop that is aligned with the reference point.

Aspect 14: The method of any of aspects 12 through 13, wherein the bandwidth part hopping pattern and the measurement gap pattern share a common switching gap for switching between different frequencies at the UE.

Aspect 15: The method of aspect 12, wherein the reference point corresponds to a start time of a first measurement gap, and wherein the bandwidth part hopping pattern and the measurement gap pattern are selected to provide alignment of the reference point and an end time of a first frequency hop of the bandwidth part hopping pattern.

Aspect 16: The method of aspect 12, wherein the reference point corresponds to an end time of a first measurement gap, and wherein the bandwidth part hopping pattern and the measurement gap pattern are selected to provide alignment of the reference point and a start time of a first frequency hop of the bandwidth part hopping pattern.

Aspect 17: The method of aspect 12, wherein the adjusting comprises: adjusting a duration of a first hop of the bandwidth part hopping pattern that overlaps with, or is adjacent to, a first measurement gap of the measurement gap pattern, to provide alignment of the reference point with a start or end time of a first frequency hop of the bandwidth part hopping pattern.

Aspect 18: The method of aspect 17, wherein the first hop precedes the first measurement gap, and an ending time of the first hop is extended to provide an ending time boundary that is aligned with the reference point.

Aspect 19: The method of any of aspects 17 through 18, wherein the first hop overlaps the first measurement gap, and an ending time of the first hop is extended to provide an ending time boundary that corresponds to a subsequent hop to the first hop, and wherein a frequency switch associated with the subsequent hop is skipped.

Aspect 20: The method of aspect 17, wherein the first hop follows the first measurement gap, and a starting time of the first hop is advanced to provide a starting time boundary that is aligned with the reference point.

Aspect 21: The method of any of aspects 17 through 20, wherein the adjusting further comprises: determining whether to extend or shorten the duration of a subsequent hop to the first hop based at least in part on a non-overlapping duration of the first hop and the first measurement gap, a frequency separation from a prior hop of the bandwidth part hopping pattern that is prior to the first measurement gap, the duration of the first hop relative to a measurement gap duration, or any combinations thereof.

Aspect 22: The method of aspect 12, wherein the adjusting comprises: adjusting a duration of a first hop of the bandwidth part hopping pattern to align an ending time of the first hop with the reference point; and shifting subsequent hops to the first hop of the bandwidth part hopping pattern by an amount of the adjusted duration of the first hop, and wherein respective durations of the subsequent hops are unchanged.

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a first base station, comprising a processor; memory coupled with the processor; and instructions stored in the memory and executable by the processor to cause the apparatus to perform a method of any of aspects 12 through 22.

Aspect 27: An apparatus for wireless communication at a first base station, comprising at least one means for performing a method of any of aspects 12 through 22.

Aspect 28: A non-transitory computer-readable medium storing code for wireless communication at a first base station, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   identifying a bandwidth part hopping pattern for communication with a first access network entity, and a set of two or more switching timings for switching between different frequencies of a set of frequencies within a carrier bandwidth for the communication with the first access network entity;
   identifying a measurement gap pattern for measurement of one or more reference signals from one or more neighboring access network entities, the measurement gap pattern indicates a measurement gap length and a periodicity of repetitions of measurement gaps;
   adjusting at least one switching time of the set of two or more switching timings of the bandwidth part hopping pattern to align the at least one switching time with a reference point associated with the measurement gap pattern, the reference point comprising a start time or an end time of a first measurement gap, wherein the adjustment of the at least one switching time of the set of two or more switching timings provides that the bandwidth part hopping pattern and the measurement gap pattern share a common switching gap for retuning to a different frequency at the UE;
   communicating with the first access network entity using the bandwidth part hopping pattern according to the adjusted set of two or more switching timings; and
   measuring the one or more reference signals from the one or more neighboring access network entities according to the measurement gap pattern.

2. The method of claim 1, further comprising:
   receiving information that indicates the bandwidth part hopping pattern and the measurement gap pattern, and wherein the reference point corresponds to the end time of the first measurement gap and a start time of a first frequency hop of the bandwidth part hopping pattern is aligned with the reference point, or the reference point corresponds to the start time of the first measurement gap and an end time of the first frequency hop is aligned with the reference point.

3. The method of claim 1, wherein the reference point corresponds to the start time of the first measurement gap, and wherein the bandwidth part hopping pattern and the measurement gap pattern are selected to provide alignment of the reference point and an end time of a first frequency hop of the bandwidth part hopping pattern.

4. The method of claim 1, wherein the reference point corresponds to the end time of the first measurement gap, and wherein the bandwidth part hopping pattern and the measurement gap pattern are selected to provide alignment of the reference point and a start time of a first frequency hop of the bandwidth part hopping pattern.

5. The method of claim 1, wherein the adjusting comprises:
adjusting a duration of a first frequency hop of the bandwidth part hopping pattern that overlaps with, or is adjacent to, the first measurement gap of the measurement gap pattern, to provide alignment of the reference point with a start or end time of the first frequency hop of the bandwidth part hopping pattern.

6. The method of claim 5, wherein the first frequency hop precedes the first measurement gap, and an ending time of the first frequency hop is extended to provide an ending time boundary that is aligned with the reference point.

7. The method of claim 5, wherein the first frequency hop overlaps the first measurement gap, and an ending time of the first frequency hop is extended to provide an ending time boundary that corresponds to a subsequent frequency hop to the first frequency hop, and wherein a frequency switch associated with the subsequent frequency hop is skipped.

8. The method of claim 5, wherein the first frequency hop follows the first measurement gap, and a starting time of the first frequency hop is advanced to provide a starting time boundary that is aligned with the reference point.

9. The method of claim 5, wherein the adjusting further comprises:
determining whether to extend or shorten a duration of a subsequent frequency hop to the first frequency hop based at least in part on a non-overlapping duration of the first frequency hop and the first measurement gap, a frequency separation from a prior frequency hop of the bandwidth part hopping pattern that is prior to the first measurement gap, the duration of the first frequency hop relative to a measurement gap duration, or any combinations thereof.

10. The method of claim 1, wherein the adjusting comprises:
adjusting a duration of a first frequency hop of the bandwidth part hopping pattern to align an ending time of the first frequency hop with the reference point; and
shifting subsequent frequency hops to the first frequency hop of the bandwidth part hopping pattern by an amount of the adjusted duration of the first frequency hop, and wherein respective durations of the subsequent frequency hops are unchanged.

11. A method for wireless communication at a first access network entity, comprising:
identifying a bandwidth part hopping pattern for a user equipment (UE) for communication with the first access network entity, and a set of two or more switching timings for switching between different frequencies of a set of frequencies within a carrier bandwidth for the communication with the first access network entity;
identifying a measurement gap pattern for UE measurement of one or more reference signals from one or more neighboring access network entities, the measurement gap pattern indicates a measurement gap length and a periodicity of repetitions of measurement gaps;
adjusting at least one switching time of the set of two or more switching timings of the bandwidth part hopping pattern to align the at least one switching time with a reference point associated with the measurement gap pattern, the reference point comprising a start time or an end time of a first measurement gap, wherein the adjustment of the at least one switching time of the set of two or more switching timings provides that the bandwidth part hopping pattern and the measurement gap pattern share a common switching gap for switching between different frequencies at the UE; and
communicating with the UE using the bandwidth part hopping pattern according to the adjusted set of two or more switching timings.

12. The method of claim 11, further comprising:
transmitting, to the UE, information that indicates the bandwidth part hopping pattern and the measurement gap pattern, and wherein the reference point corresponds to the end time of the first measurement gap and a start time of a first frequency hop of the bandwidth part hopping pattern is aligned with the reference point, or the reference point corresponds to the start time of the first measurement gap and an end time of the first frequency hop is aligned with the reference point.

13. The method of claim 11, wherein the reference point corresponds to the start time of the first measurement gap, and wherein the bandwidth part hopping pattern and the measurement gap pattern are selected to provide alignment of the reference point and an end time of a first frequency hop of the bandwidth part hopping pattern.

14. The method of claim 11, wherein the reference point corresponds to the end time of the first measurement gap, and wherein the bandwidth part hopping pattern and the measurement gap pattern are selected to provide alignment of the reference point and a start time of a first frequency hop of the bandwidth part hopping pattern.

15. The method of claim 11, wherein the adjusting comprises:
adjusting a duration of a first frequency hop of the bandwidth part hopping pattern that overlaps with, or is adjacent to, the first measurement gap of the measurement gap pattern, to provide alignment of the reference point with a start or end time of a first frequency hop of the bandwidth part hopping pattern.

16. The method of claim 15, wherein the first frequency hop precedes the first measurement gap, and an ending time of the first frequency hop is extended to provide an ending time boundary that is aligned with the reference point.

17. The method of claim 15, wherein the first frequency hop overlaps the first measurement gap, and an ending time of the first frequency hop is extended to provide an ending time boundary that corresponds to a subsequent frequency hop to the first frequency hop, and wherein a frequency switch associated with the subsequent frequency hop is skipped.

18. The method of claim 15, wherein the first frequency hop follows the first measurement gap, and a starting time of the first frequency hop is advanced to provide a starting time boundary that is aligned with the reference point.

19. The method of claim 15, wherein the adjusting further comprises:
determining whether to extend or shorten the duration of a subsequent frequency hop to the first frequency hop based at least in part on a non-overlapping duration of the first frequency hop and the first measurement gap, a frequency separation from a prior frequency hop of the bandwidth part hopping pattern that is prior to the first measurement gap, the duration of the first frequency hop relative to a measurement gap duration, or any combinations thereof.

20. The method of claim 11, wherein the adjusting comprises:

adjusting a duration of a first frequency hop of the bandwidth part hopping pattern to align an ending time of the first frequency hop with the reference point; and shifting subsequent frequency hops to the first frequency hop of the bandwidth part hopping pattern by an amount of the adjusted duration of the first frequency hop, and wherein respective durations of the subsequent frequency hops are unchanged.

21. An apparatus for wireless communication at a user equipment (UE), comprising:

one or more memories storing processor-executable code; and one or more processors coupled with the one or more memories and individually or collectively operable to execute the code to cause the UE to:

identify a bandwidth part hopping pattern for communication with a first access network entity, and a set of two or more switching timings for switching between different frequencies of a set of frequencies within a carrier bandwidth for the communication with the first access network entity;

identify a measurement gap pattern for measurement of one or more reference signals from one or more neighboring access network entities, the measurement gap pattern indicates a measurement gap length and a periodicity of repetitions of measurement gaps;

adjust at least one switching time of the set of two or more switching timings of the bandwidth part hopping pattern to align the at least one switching time with a reference point associated with the measurement gap pattern, the reference point comprising a start time or an end time of a first measurement gap, wherein the adjustment of the at least one switching time of the set of two or more switching timings provides that the bandwidth part hopping pattern and the measurement gap pattern share a common switching gap for retuning to a different frequency at the UE;

communicate with the first access network entity using the bandwidth part hopping pattern according to the adjusted set of two or more switching timings; and measure the one or more reference signals from the one or more neighboring access network entities according to the measurement gap pattern.

22. The apparatus of claim 21, wherein, to adjust at least the first switching time, the one or more processors are individually or collectively operable to execute the code to cause the UE to:

adjust a duration of a first frequency hop of the bandwidth part hopping pattern that overlaps with, or is adjacent to, the first measurement gap of the measurement gap pattern, to provide alignment of the reference point with a start or end time of a first frequency hop of the bandwidth part hopping pattern.

23. The apparatus of claim 22, wherein the first frequency hop precedes the first measurement gap, and an ending time of the first frequency hop is extended to provide an ending time boundary that is aligned with the reference point.

24. The apparatus of claim 22, wherein the first frequency hop overlaps the first measurement gap, and an ending time of the first frequency hop is extended to provide an ending time boundary that corresponds to a subsequent frequency hop to the first frequency hop, and wherein a frequency switch associated with the subsequent frequency hop is skipped.

25. The apparatus of claim 22, wherein the first frequency hop follows the first measurement gap, and a starting time of the first frequency hop is advanced to provide a starting time boundary that is aligned with the reference point.

26. An apparatus for wireless communication at a first access network entity, comprising:

one or more memories storing processor-executable code; and one or more processors coupled with the one or more memories and individually or collectively operable to execute the code to cause the first access network entity to:

identify a bandwidth part hopping pattern for a user equipment (UE) for communication with the first access network entity, and a set of two or more switching timings for switching between different frequencies of a set of frequencies within a carrier bandwidth for the communication with the first access network entity;

identify a measurement gap pattern for UE measurement of one or more reference signals from one or more neighboring access network entities, the measurement gap pattern indicates a measurement gap length and a periodicity of repetitions of measurement gaps;

adjust at least one switching time of the set of two or more switching timings of the bandwidth part hopping pattern to align the at least one switching time with a reference point associated with the measurement gap pattern, the reference point comprising a start time or an end time of a first measurement gap, wherein the adjustment of the at least one switching time of the set of two or more switching timings provides that the bandwidth part hopping pattern and the measurement gap pattern share a common switching gap for switching between different frequencies at the UE; and communicate with the UE using the bandwidth part hopping pattern according to the adjusted set of two or more switching timings.

27. The apparatus of claim 26, wherein, to adjust the at least one switching time, the one or more processors are individually or collectively operable to execute the code to cause the first access network entity to:

transmit, to the UE, information that indicates the bandwidth part hopping pattern and the measurement gap pattern, and wherein the reference point corresponds to the end time of the first measurement gap and a start time of a first frequency hop of the bandwidth part hopping pattern is aligned with the reference point, or the reference point corresponds to the start time of the first measurement gap and an end time of the first frequency hop is aligned with the reference point.

* * * * *